United States Patent [19]
Suganuma

[11] Patent Number: 6,034,794
[45] Date of Patent: Mar. 7, 2000

[54] METHOD OF CORRECTING IMAGE SIGNAL OUTPUTTED FROM LINEAR IMAGE SENSOR

[75] Inventor: Atsushi Suganuma, Minamiashigara, Japan

[73] Assignee: Fuji Photo Film Co., Ltd., Japan

[21] Appl. No.: 08/869,885

[22] Filed: Jun. 5, 1997

[30] Foreign Application Priority Data

Jun. 6, 1996 [JP] Japan .................................. 8-144650

[51] Int. Cl.⁷ ....................................................... G03F 3/08
[52] U.S. Cl. .......................................................... 358/518
[58] Field of Search ................................... 358/518, 519, 358/520, 521, 525, 526, 528, 529

[56] References Cited

U.S. PATENT DOCUMENTS

| | | | |
|---|---|---|---|
| 4,996,591 | 2/1991 | Kadowaki et al. | 358/80 |
| 5,138,443 | 8/1992 | Ikeda et al. | 358/80 |
| 5,680,230 | 10/1997 | Kaburagi et al. | 358/520 |
| 5,682,443 | 10/1997 | Gouch et al. | 382/254 |
| 5,870,142 | 3/1999 | Noda et al. | 348/266 |

FOREIGN PATENT DOCUMENTS

| | | | |
|---|---|---|---|
| 6-48844 | 6/1994 | Japan | H04N 1/04 |
| 6-85556 | 10/1994 | Japan | H04N 1/393 |
| 7-283915 | 10/1995 | Japan | H04N 1/19 |

*Primary Examiner*—Leo H. Boudreau
*Assistant Examiner*—Shawn B Cage
*Attorney, Agent, or Firm*—Sughrue, Mion, Zinn, Macpeak & Seas, PLLC

[57] ABSTRACT

Light which bears image information carried by a subject is two-dimensionally read through tricolor separating optical systems with linear image sensors for the three colors R, G, B. Odd- and even-numbered pixel signals outputted from the linear image sensors 1 are alternately read to produce an image signal which comprises a series of pixel signals. The image signal is corrected successively by an offset level corrector, a sensitivity variation corrector, an auxiliary scanning curvature/odd- and even-numbered pixel level difference corrector, a main scanning aberration/magnification corrector, and a luminance-to-density conversion corrector, thereby producing an image signal for producing a high-quality reproduced image.

14 Claims, 11 Drawing Sheets

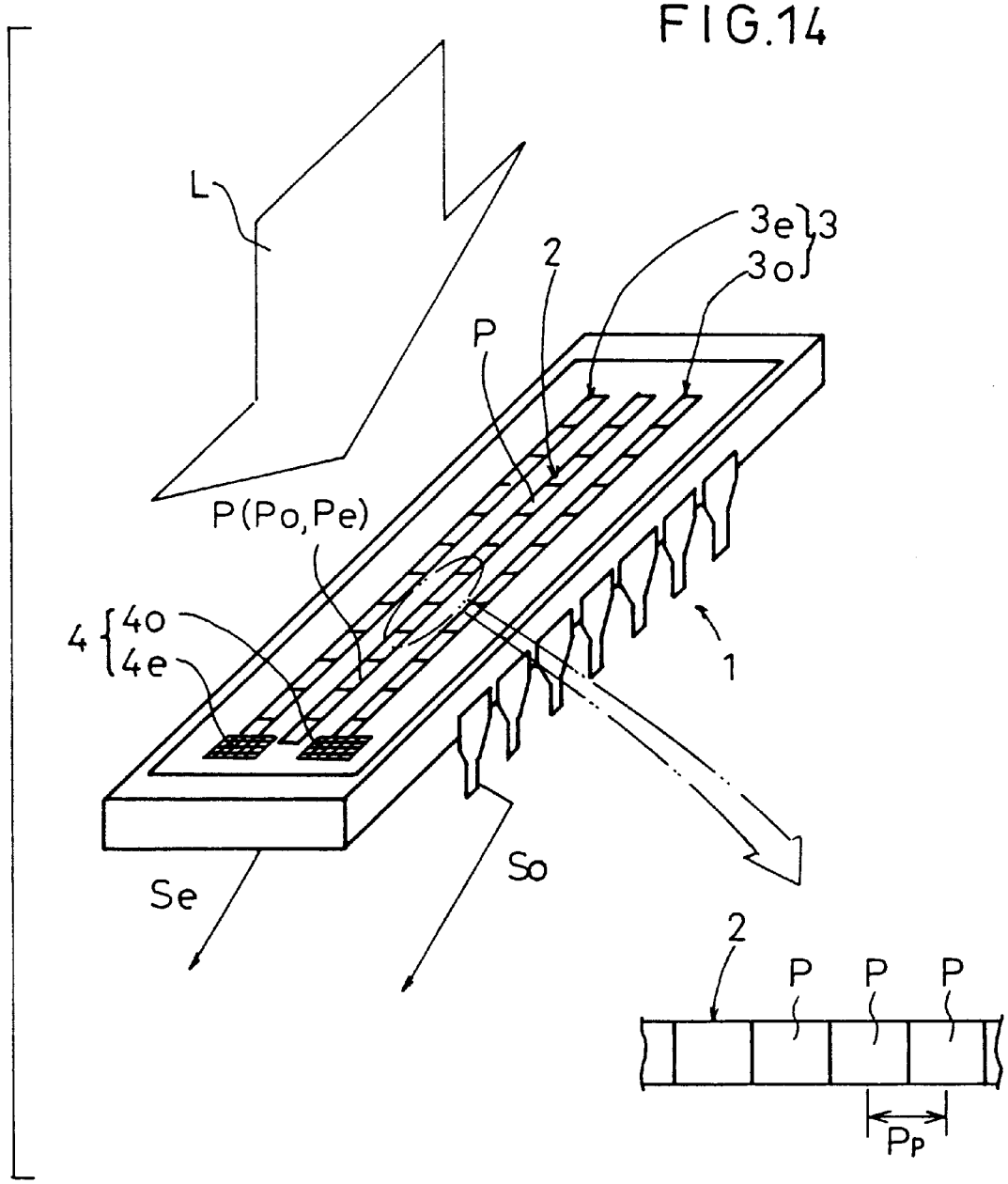

METHOD OF CORRECTING IMAGE SIGNAL OUTPUTTED FROM LINEAR IMAGE SENSOR

BACKGROUND OF THE INVENTION

1. Field of the Invention

The present invention relates to a method of correcting an output image signal in a color image reading apparatus which has three R, G, B linear image sensors, each comprising an array of photoelectric transducer pixels arranged in a main scanning direction, for photoelectrically reading reflected or transmitted light which represents image information carried by a subject.

2. Description of the Related Art

Color image reading systems operate by applying illuminating light to a subject placed on a subject table, guiding light representing image information carried by the subject as reflected or transmitted light to a focusing optical system, supplying the light to tricolor separating optical systems such as tricolor separating prisms or the like, and photoelectrically reading the light with R (red), G (green), B (blue) linear image sensors mounted on respective exist surfaces of the tricolor separating prisms.

The subject is read in a main scanning direction by the linear image sensors while at the same time the subject is moved relatively to the linear image sensors in an auxiliary scanning direction that is substantially perpendicular to the main scanning direction, so that two-dimensional image information of the colors R, G, B can be produced.

As schematically shown in FIG. 14 of the accompanying drawings, a general linear image sensor 1 basically comprises a photodetector 2 comprising a linear array of photoelectric transducer elements (hereinafter referred to as "pixels") P arranged in a longitudinal (main scanning) direction and a pixel transfer unit 3 comprising an odd-numbered pixel transfer array 3o and an even-numbered pixel transfer array 3e which are positioned one on each side of the photodetector 2. The pixels P include odd-numbered pixels Po and even-numbered pixels Pe.

Light L applied to the linear image sensor 1 is detected by the photodetector 2 and converted into electric charges by the respective pixels P. The electric charges are successively shifted from the odd- and even-numbered pixels Po, Pe to the corresponding odd- and even-numbered pixel transfer arrays 3o, 3e in response to shift pulses that are periodically generated at constant time intervals. Thereafter, the electric charges are outputted as odd- and even-numbered pixel signals So, Se from odd- and even-numbered output sections 4o, 4e of FDAs (floating diffusion amplifiers) or the like through respective output terminals of the linear image sensor 1.

The odd- and even-numbered pixel signals So, Se are alternately read through a CDS (correlated double signal sampling) circuit and an amplifier (not shown), and converted by an A/D (analog-to-digital) converter (not shown) into digital image signals, which are then alternately introduced by a selector switch and stored in a line memory or the like as one-line image data corresponding to the photodetector 2.

If the resolution of the color image reading system with the tricolor separating optical system is to be increased, then the color image reading system may basically use a linear image sensor having many photoelectric transducer pixels P. Recently, linear image sensors having more than 7000 photoelectric transducer pixels are available in the market.

For increasing the gradation of output images, it is necessary for the linear image sensor to have a wide dynamic range. Some linear image sensors having more than 7000 photoelectric transducer pixels have a dynamic range of three figures or greater and are relatively inexpensive.

When images are read or detected by such linear image sensors, various problems and demands need to be solved and satisfied as described below.

(1) When a high-density subject with a white blank area is read, an offset shift component is generated as an undesirable offset level variation by a pixel transfer array.

(2) The pixels of a linear image sensor may have different sensitivities.

(3) Linear image sensors may contain defective pixels.

(4) The resolution of linear image sensors needs to be increased.

(5) The photodetector of a linear image sensor (joined areas of photoelectric transducer pixels) suffers a curvature in the auxiliary scanning direction.

(6) The odd-numbered pixels and the even-numbered pixels may have different linearity characteristics.

(7) Linear image sensors may be subject to aberrations in the main scanning direction which are caused by the focusing optical system.

(8) Noise may be introduced when a luminance signal is converted into a density signal.

(9) Images represented by output image signals from linear image sensors may contain a coarse feature in a high-density-level area where a luminance signal level is low.

SUMMARY OF THE INVENTION

It is therefore an object of the present invention to provide a method of correcting an output image signal from a linear image sensor to produce an image signal representing an output image which has a wide range of gradation levels and is of high quality.

Another object of the present invention is to provide a method of correcting an output image signal from a linear image sensor so as to be able to reduce unwanted level shifts produced in pixel transfer arrays of the linear image sensor, match variations of individual photoelectric transducer pixels of the linear image sensor, correct random curvatures in an auxiliary scanning direction of the linear image sensor thereby to reduce color shifts, correct variations in the linearity characteristics of odd-numbered pixels and the even-numbered pixels, correct a magnitude in a main scanning direction, which includes aberrations of an optical system, with an electric magnitude determined with respect to individual pixel data based on a specified resolution in a main scanning direction, and convert a density signal into a luminance signal for thereby generating halftone dot % data with ease.

Still another object of the present invention is to provide a method of correcting an output image signal from a linear image sensor so as to be able to remove a coarse feature from a low-density-level area of an output image.

Yet still another object of the present invention is to provide a method of correcting an output image signal from a linear image sensor so as to be able to increase the resolution of an output image and remove a coarse feature from a low-density-level area of the output image.

A further object of the present invention is to provide a method of correcting an output image signal from a linear image sensor so as to be able to prevent stripes in the auxiliary scanning direction from appearing in an output image due to defective pixels which may be present in the linear image sensor.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 14 is a perspective view of a general linear image sensor having a semiconductor package structure.

DETAILED DESCRIPTION OF THE PREFERRED EMBODIMENTS

Figure 1:
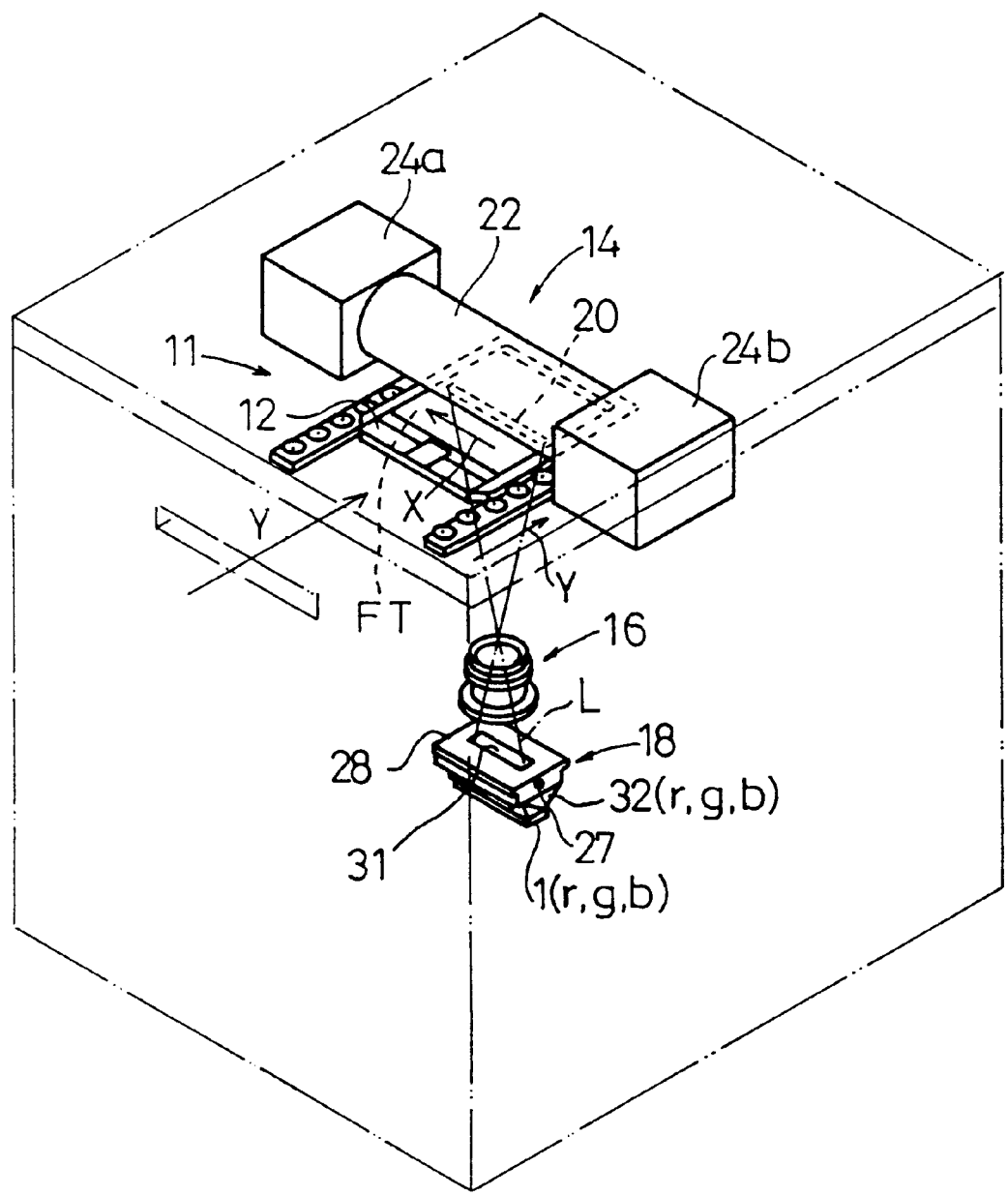
FIG. 1 is a perspective view of a transmissive-subject image reading system to which the present invention is applicable.

The present invention will be described below with reference to FIGS. 1 through 13. Those parts of FIGS. 1 through 13 which are identical to those shown in FIG. 14 are denoted by identical reference numerals and representations, and will not be described in detail below.

Figure 2:
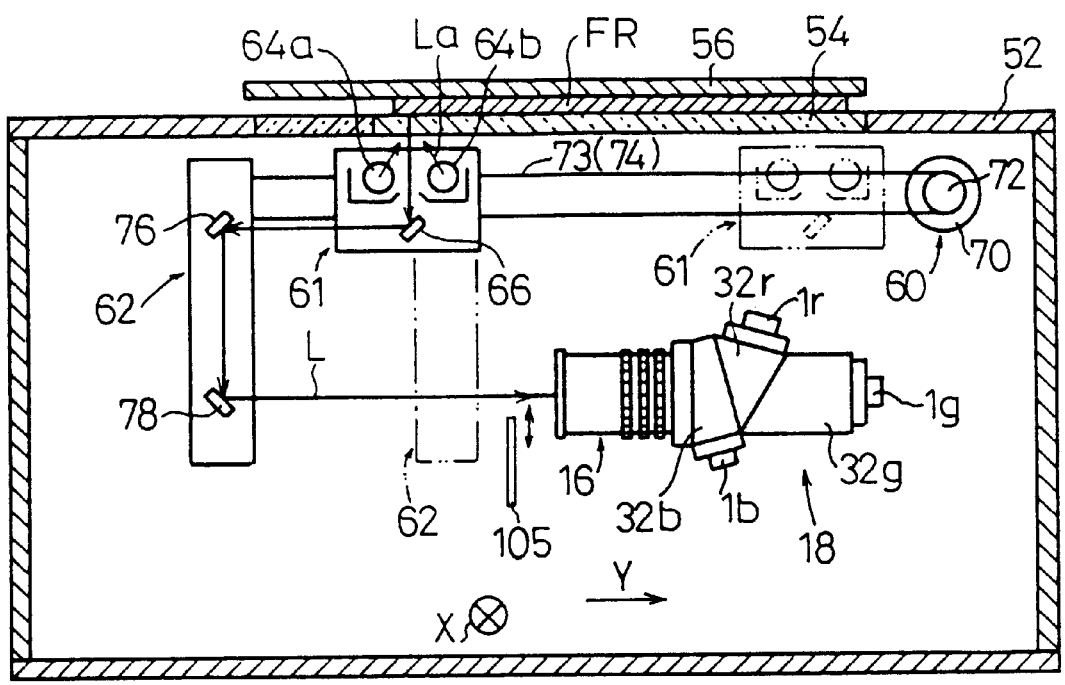
FIG. 2 is a schematic vertical cross-sectional view of a reflective-subject image reading system to which the present invention is applicable.

The present invention is applicable to both a transmissive-subject image reading system 10T shown in FIG. 1 and a reflective-subject image reading system 10R shown in FIG. 2. The transmissive-subject image reading system 10T does not have a reflecting optical system (first and second mirror units 61, 62) of the reflective-subject image reading system 10R. The transmissive-subject image reading system 10T and the reflective-subject image reading system 10R will be described below.

As shown in FIG. 1, the transmissive-subject image reading system 10T has a feed mechanism 11 which moves a subject cassette 12 in the direction indicated by the arrow Y (auxiliary scanning direction Y) and an illuminating optical system 14 which applies illuminating light to the subject cassette 12 in the direction indicated by the arrow X (main scanning direction X). Image information recorded on a transmissive subject FT which is carried by the subject cassette 12 is carried by transmitted light L, which is focused by a focusing optical system 16 including a zoom lens onto a focusing unit 18. The focusing unit 18 converts the focused light L to an electric signal. The illuminating optical system 14, the focusing optical system 16, and the focusing unit 18 are positioned and fixed in a housing by fixing members (not shown).

The illuminating optical system 14 comprises a cylindrical diffusion chamber 22 having an inner light diffusion surface and a longitudinal slit 20, and a pair of light sources 24a, 24b mounted on the respective opposite ends of the cylindrical diffusion chamber 22 and each comprising a halogen lamp or the like.

The focusing unit 18 comprises a plurality of prisms (tricolor separating prisms or tricolor separating optical systems) 32r, 32g, 32b for separating the transmitted light L into lights of colors R (red), G (green), B (blue). The prisms 32r, 32g, 32b (which may also be collectively referred to as a prism 32) are mounted on a lower surface of a base 28 having a slit 31 defined therein. Linear image sensors 1r, 1g, 1b (which may also be collectively referred to as a linear image sensor 1) in the form of CCDs are fixed as photoelectric transducers to the respective exit surfaces of the prisms 32r, 32g, 32b. Each of the linear image sensors 1r, 1g, 1b is basically of the same structure as the linear image sensor shown in FIG. 14. In the illustrated embodiment, one line of the photodetector 2 of each of the linear image sensors 1r, 1g, 1b has 7500 photoelectric transducer elements or pixels spaced at a pixel pitch Pp (see FIG. 14)≈9 $\mu$m.

A piezoelectric device 27 mounted on an end of the base 28 of the focusing unit 18 in the main scanning direction X serves as a displacing means for displacing the base 28, the tricolor separating prisms 32r, 32g, 32b, and the linear image sensors 1r, 1g, 1b selectively to a plurality of positions in the main scanning direction X. The piezoelectric device 27 is of a known structure and can be actuated by a piezoelectric signal which is generated by a piezoelectric signal generator (not shown) in synchronism with a linear synchronizing signal from a controller (not shown) (for example, see Japanese laid-open patent publication No. 7-283915).

In the transmissive-subject image reading system 10T shown in FIG. 1, the subject cassette 12 which is fed in the auxiliary scanning direction Y by the feed mechanism 11 is scanned in the main scanning direction X by the linear image sensors 1r, 1g, 1b, which two-dimensionally read an image on the entire surface of the subject FT held in the subject cassette 12.

Photoelectrically converted signals generated by the linear image sensors 1r, 1g, 1b are supplied to an image signal correcting apparatus (described later on).

The reflective-subject image reading system 10R shown in FIG. 2 comprises a subject table 52 openably and closably mounted on an upper panel of a housing. The subject table 52 has a transparent glass panel 54 for placing a reflective subject FR thereon, and supports a subject holder 56 swingably positioned over the glass panel 54. Those parts shown in FIG. 2 which are identical to those shown in FIGS. 1 and 14 are denoted by identical reference numerals and representations, and will not be described in detail below.

In FIG. 2, the housing accommodates therein a reflecting optical system comprising first and second mirror units 61, 62 for changing an optical path of light L reflected by a reflective subject FR, a feed mechanism 60 for feeding the first and second mirror units 61, 62 in an auxiliary scanning direction Y, a focusing optical system 16 including a zoom lens for focusing the light L representing image information which has been reflected by the first and second mirror units 61, 62, and a focusing unit 18 for photoelectrically reading the image information represented by the light L which has been focused by the focusing optical system 16. The first mirror unit 61 includes an illuminating optical system 14.

The illuminating optical system 14 comprises a pair of illuminating light sources 64a, 64b (which may also be referred to as illuminating light sources 64) for irradiating the reflective subject FR with illuminating light La. The first mirror unit 61 also has a reflecting mirror 66 for changing the vertical optical path of the light L reflected by the reflective subject FR to a horizontal optical path for thereby guiding the light L to the second mirror unit 62. The illuminating light sources 64a, 64b and the reflecting mirror 66 are elongate in the main scanning direction X (normal to the sheet of FIG. 2) which is perpendicular to the auxiliary scanning direction Y.

The optical path of the light L reflected by the reflecting mirror 66 is further changed twice by reflecting mirrors 76, 78 of the second mirror unit 62 which are elongate in the main scanning direction X, for thereby guiding the light L to the focusing optical system 16. An ND (neutral density) filter 105, which will be described in detail later on, is positioned in front of the focusing optical system 16, the ND filter 105 being movable transversely into and out of the optical path leading to the focusing optical system 16.

The focusing unit 18 has tricolor separating prisms 32r, 32g, 32b disposed in the optical path of the light L and integrally combined with the focusing optical system 16. Linear image sensors 1r, 1g, 1b in the form of CCDs are fixed to the respective exit surfaces of the prisms 32r, 32g, 32b.

The feed mechanism 60 comprises a stepping motor 70 for moving the first and second mirror units 61, 62 in the auxiliary scanning direction Y, and a pulley 72 is coupled to the rotatable shaft of the stepping motor 70. First and second strings 73, 74 are trained around the pulley 72 and coupled to the first and second mirror units 61, 62 through a plurality of pulleys (not shown) for moving the first mirror unit 61 at a speed twice the speed at which the second mirror unit 62 is moved. The above structure of the feed mechanism 60 is well known in the art. Since the second mirror unit 62 is moved at a speed half the speed at which the first mirror unit 61 is moved, the second mirror unit 62 is displaced in the auxiliary scanning direction Y by a distance half the distance that the first mirror unit 61 is displaced. Therefore, while the first and second mirror units 61, 62 are being displaced in the auxiliary scanning direction Y, i.e., while the image information of the reflective subject FR is being read, the length of the optical path of the reflected light L between the reflective subject FR and the focusing optical system 16 is maintained constant, so that the reflected light L remains focused by the focusing optical system 16.

When the first and second mirror units 61, 62 are displaced from the solid-line positions to the two-dot-and-dash-line positions in FIG. 2, the image information carried by the reflective subject FR is two-dimensionally read in its entirety by the linear image sensors 1r, 1g, 1b. Photoelectrically converted signals generated by the linear image sensors 1r, 1g, 1b are supplied to an image signal correcting apparatus (described later on).

Figure 3:
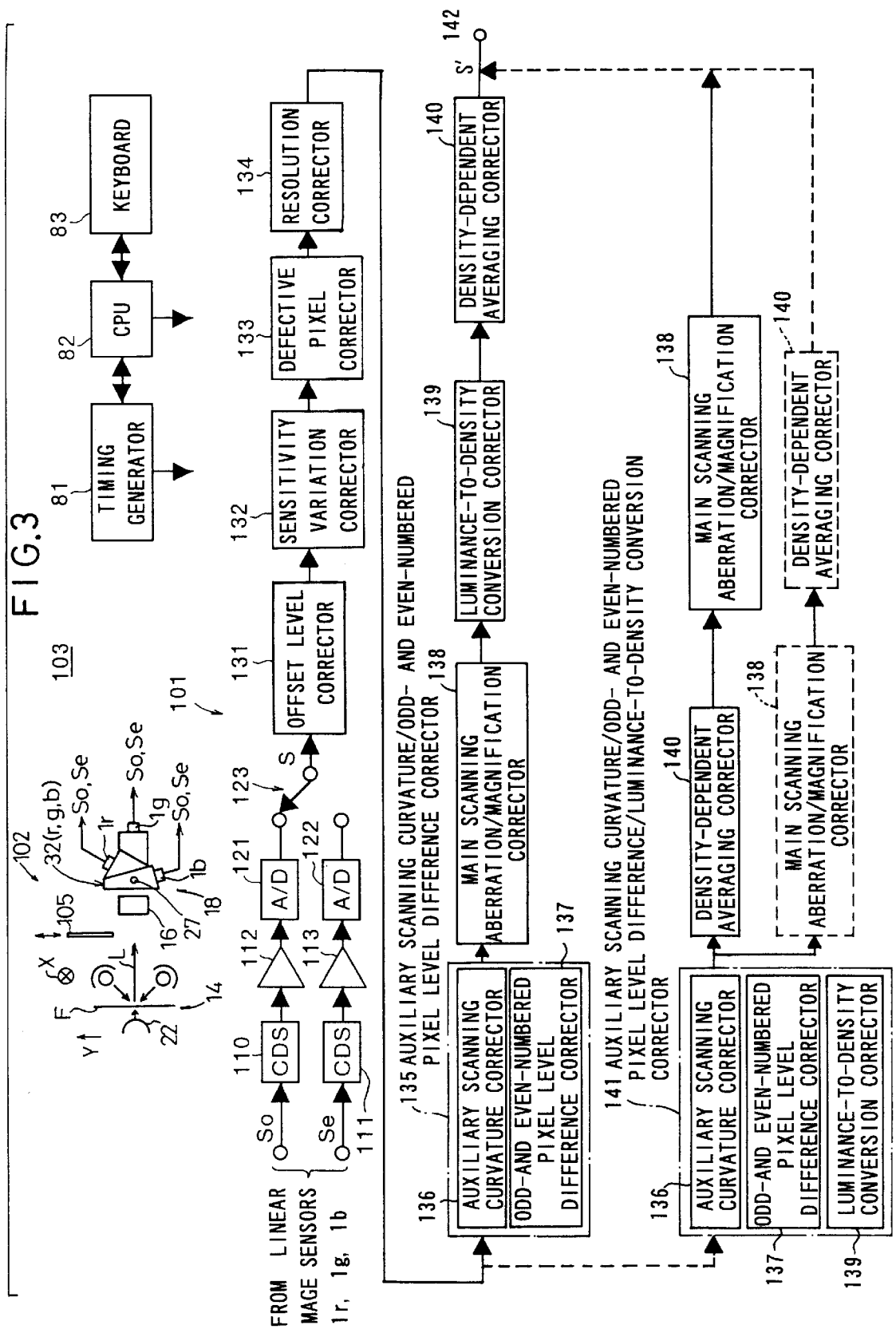
FIG. 3 is a block diagram of a functional arrangement in the transmissive-subject image reading system for carrying out a method of correcting an output image signal from a linear image sensor according to the present invention.

FIG. 3 shows an image signal correcting system 103 which can be used in combination with both the transmissive-subject image reading system 10T shown in FIG. 1 and the reflective-subject image reading system 10R shown in FIG. 2. The image signal correcting system 103 comprises an image signal correcting apparatus 101 to which the present invention is applied, and an image reader 102 which comprises optical components from the subject FR, FT to the focusing unit 18. The image signal correcting system 103 includes a timing generator 81 for generating various clock signals for energizing the linear image sensors 1, a central processing unit (CPU) 82 for performing various controlling, calculating, and processing functions of the image signal correcting system 103, and a keyboard 83 serving as an input device for entering operation modes and various data into the CPU 82.

In FIG. 3, a subject F may be the transmissive subject FT, the reflective subject FR, a test chart described later on, a shading plate described later on, or the like, the test chart or the shading plate being a subject for use in a test. Light L which carries image information of the subject F is applied through the focusing optical system 16 including a zoom lens and the tricolor separating prisms 32r, 32g, 32b to the linear image sensors 1r, 1g, 1b of the focusing unit 18. The ND filter 105 (not shown in FIG. 1), which has a density value D=3.0 for reducing the quantity of light L carrying image information to 1/1000, is positioned in front of the focusing optical system 16. The ND filter 105 is transversely movable into and out of the optical path as indicated by the arrows. Odd- and even-numbered pixel signals So, Se outputted from the linear image sensors 1r, 1g, 1b are supplied to known CDS (correlated double signal sampling) circuits 110, 111 of the image signal correcting apparatus 101, which remove reset noise from the odd- and even-numbered pixel signals So, Se.

The odd- and even-numbered pixel signals from which the reset noise has been removed by the CDS circuits 110, 111 are supplied respectively through amplifiers 112, 113 which are capable of adjusting gains and offset levels to respective A/D converters 121, 122 each having a 14-bit resolution.

The A/D converters 121, 122 convert the supplied odd- and even-numbered pixel signals into digital signals S (which may also be referred to as digital data, digital pixel signals, digital image data, pixel signals, or pixel data). The digital odd- and even-numbered signals S of one line corresponding to the photodetector 2 are alternately supplied through a selector switch 123 comprising a multiplexer or the like to an offset level corrector 131 of the image signal correcting apparatus 101. Although not shown, the circuits ranging from the CDS circuits 110, 111 to an output terminal of the selector switch 123 are provided in three systems corresponding respectively to the linear image sensors 1r, 1g, 1b. The image signal correcting apparatus 101 includes other correctors 132~140, described later on, and each of the correctors 131~140 include a circuit comprising a PGA (programmable gate array) which is programmed to perform a desired logic function.

Corrected image signals outputted from the correctors 131~140 are denoted by S irrespective of which correctors 131~140 the corrected image signals are outputted from. The levels of the image signals are also denoted by S, and similarly pixel signals and their levels are also denoted by S. Those various signals which are denoted by S will be described in a manner to be easily distinguishable from each other.

The offset level corrector 131 determines a corrective quantity for the offset level of each of the pixel signals of a certain line from a gradient sum of the empty-transfer level of the line and the empty-transfer level of a preceding line, and supplies an image signal corrected by the determined corrective quantity to a sensitivity variation corrector 132.

The sensitivity variation corrector 132 determines a sensitivity corrective quantity of each of the pixels based on an image signal produced when a white subject F (corresponding to reflective-subject image reading system 10R) or a transparent subject F (corresponding to the transmissive-subject image reading system 10T) is read directly by the linear image sensor 1 and an image signal produced when the white subject F or the transparent subject F is read by the linear image sensor 1 through the ND filter 105 inserted in the optical path, and supplies an image signal corrected by the determined corrective quantity to a defective pixel corrector 133.

The defective pixel corrector 133 determines that a certain pixel is a defective pixel when a pixel signal generated therefrom at the time the white subject F or the transparent subject F is read by the linear image sensor 1 is of a level smaller than a predetermined threshold, generates a pixel signal having as its level an arithmetic mean of the levels of preceding and following pixels, and supplies the generated pixel signal instead of the pixel signal of the defective pixel to a resolution corrector 134.

The defective pixel corrector 133 may alternatively determine a defective pixel according to an offline process described below, and stores the pixel number of the determined pixel. Then, when the image is actually read from the subject F by the image reading system which has the image signal correcting system 103 shown in FIG. 3 the defective pixel corrector 133 generates a pixel signal having as its level an arithmetic mean of the levels of preceding and following pixels, and supplies the generated pixel signal instead of the pixel signal of the defective pixel to the resolution corrector 134.

According to the offline process, light emitted from a light source (not shown) is diffused by a diffusion plate (not shown), and when the diffused light is read directly by the photoelectric transducer pixels of the linear image sensor 1, the levels of pixel signals from the photoelectric transducer pixels with respect to the detected quantity of light (a density value D=0: the quantity of light may be considered to be in the vicinity of highlights) is measured and stored, for example, as a digital level Lh=16000 after the A/D conversion. Then, when an ND filter (not shown) which has a density value D=3.0 is inserted in the optical path between the diffusion plate and the linear image sensor 1 to reduce the quantity of light reading the linear image sensor 1, the levels of pixel signals from the photoelectric transducer pixels with respect to the reduced quantity of light (the quantity of light may be considered to be in the vicinity of shadows) is measured and stored as a digital level Ls3= $16000 \times 10^{-3.0}=16$ after the A/D conversion.

Thereafter, the above ND filter is removed and an ND filter (not shown) which has a density value D=3.2 is inserted instead in the optical path, and the levels of pixel signals from the photoelectric transducer pixels with respect to the detected quantity of light (which is smaller than the quantity of light in the vicinity of shadows) is measured and stored as a digital level Ls3.2 after the A/D conversion. The level Ls3.2 is theoretically $16000 \times 10^{-3.2} \approx 10$, and the difference between the values of $10 \pm \Delta$ ($\pm \Delta$ being a margin) is used as a threshold range. If a measured value of the level Ls3.2 for a pixel falls within the threshold range, then the pixel is determined as a normal pixel, and if it falls outside of the threshold range, then the pixel is determined as a defective pixel. Rather than using the ND filter to reduce the quantity of diffused light, the quantity of light emitted from the light source (not shown) may be reduced.

The above process carried out by the defective pixel corrector 133 is summarized as follows: The photoelectric transducer pixels P of the linear image sensors 1r, 1g, 1b read pixel signal levels Lh, Ls3 with respect to quantities of light in the vicinity of highlights and shadows, and a linear formula that interconnects the pixel signal levels is produced. Then, photoelectric transducer pixels P of the linear image sensors 1r, 1g, 1b read a pixel signal level Ls3.2 with respect to a quantity of light smaller than the quantity of light in the vicinity of shadows. If the pixel signal level Ls3.2 of a pixel differs from a value (the theoretical value≈10) estimated from the linear formula by the threshold range$\pm \Delta$or more, the pixel is determined as a defective pixel, and the pixel number of the defective pixel is stored. When the pixel signal from the defective pixel whose pixel number is stored is read, a signal having a level which is equal to the average of the levels of preceding and following pixels is outputted instead of the pixel signal from the defective pixel.

The resolution corrector 134, whose operation will be described below, is applied to the transmissive-subject image reading system 10T. However, the resolution corrector 134 may be applied to the reflective-subject image reading system 10R, and can be selectively activated and inactivated under the control of the CPU 82 in response to operation of the keyboard 82 which serves as an on/off switch. When the resolution corrector 134 as applied to the reflective-subject image reading system 10R is inactivated, an output signal from the defective pixel corrector 133 is supplied directly to an auxiliary scanning curvature/odd- and even-numbered pixel level difference corrector 135.

In the resolution corrector 134, the linear image sensors 1r, 1g, 1b are displaced to three positions, for example, by 2/3 pixel pitches in the main scanning direction X for each line with respect to the subject F which is being fed in the auxiliary scanning direction Y, and pixel signals generated by the linear image sensors 1r, 1g, 1b thus displaced are arranged on the main scanning line. The pixel signals on the main scanning line are then subjected to a moving average calculating process over three pixels with respect to the main scanning direction, for thereby increasing the resolution of generated images and removing image irregularities with respect to the main scanning direction. An output signal from the resolution corrector 134 is supplied to the auxiliary scanning curvature/odd- and even-numbered pixel level difference corrector 135.

A dotted-line path from the resolution corrector 134 to an auxiliary scanning curvature/odd- and even-numbered pixel level difference/luminance-to-density conversion corrector 141 belongs to another embodiment of the present invention. Correctors according to the other embodiment of the present invention which perform identical corrective functions to those of the present embodiment are denoted by identical reference numerals, and will not be described in detail below.

The auxiliary scanning curvature/odd- and even-numbered pixel level difference corrector 135 comprises an auxiliary scanning curvature corrector 136 and an odd- and even-numbered pixel level difference corrector 137. Corrective functions of these correctors 136, 137 may be performed in any order. The auxiliary scanning curvature/odd- and even-numbered pixel level difference/luminance-to-density conversion corrector 141 according to the other embodiment comprises an auxiliary scanning curvature corrector 136, an odd- and even-numbered pixel level difference corrector 137, and a luminance-to-density conversion corrector 139, and corrective functions of these correctors 136, 137, 139 may be performed in any order.

In the auxiliary scanning curvature corrector 136, a test chart carrying a black linear image, for example, extending in the main scanning direction X is two-dimensionally read, and image data files of the pixels of each of the scanning lines over the test chart are generated. Based on the image data files, pixel shifts corresponding to color shifts in the auxiliary scanning direction between the pixels of the linear image sensor 1g as a reference linear image sensor and the pixels of the same pixel numbers of the other linear image sensors 1r, 1b are calculated for the respective pixel numbers, thus X generating a pixel shift correction table. When image information carried on a subject is actually read as image data by the linear image sensors 1r, 1g, 1b, the image data are corrected using the pixel shift correction table. The corrected image data are supplied to the odd- and even-numbered pixel level difference corrector 137.

As described above, odd - and even-numbered pixel signals. So, Se outputted from the linear image sensor 1 are alternately read to produce an image signal S. The odd- and even-numbered pixel level difference corrector 137 corrects level differences between the odd- and even-numbered pixel signals So, Se which make up the image signal S by adding, to the level of each pixel signal, an average value of the levels of pixel signals that precede and follow the pixel signal, and averaging the sum thereby to produce a corrected pixel signal. The image signal thus corrected for the level differences between the odd- and even-numbered pixel signals So, Se is then supplied to a main scanning aberration/magnification corrector 138.

Some linear image sensors have a single pixel transfer array, rather than the odd-numbered pixel transfer array 3o and the even-numbered pixel transfer array 3e, in combination with the photodetector 2 (see FIG. 14). The principles of the present invention are also applicable to those linear image sensors which have a single pixel transfer array in combination with the photodetector 2. In such an application, the odd- and even-numbered pixel level difference corrector 137 may be omitted from the image signal correcting apparatus 101.

The main scanning aberration/magnification corrector 138 may perform a known process of reading a reference chart having marks spaced at equal intervals in the main scanning direction X with the image sensors 1r, 1g, 1b and correcting an image signal representing the marks based on theoretical data for thereby correcting aberrations and a magnification in the main scanning direction X of the focusing optical system 16 (see Japanese patent publication No. 6-48844 or Japanese patent publication No. 6-85556).

The luminance-to-density conversion corrector 139 converts a luminance-level image signal produced by each image sensor 1 into a density-level image signal using a luminance-to-density conversion lookup table.

A density-dependent averaging corrector 140 outputs the density-level image signal from the luminance-to-density conversion corrector 139 as it is with respect to a low-density area, i.e., a highlight area, of the subject F, and outputs an image signal averaged with a predetermined mask size in a high-density area, i.e., a shadow area of the subject F.

Operation of the various correctors of the image signal correcting apparatus 101 shown in FIG. 3 will be described in greater detail below.

As shown in FIG. 14, when the light L is applied per main scanning line to the linear photodetector 2 which comprises the photoelectric transducer pixels P, the light L is converted thereby into electric charges that are stored in the odd- and even-numbered pixels Po, Pe. The electric charges are then successively shifted to the corresponding odd- and even-numbered pixel transfer arrays 3o, 3e in response to shift pulses that are periodically outputted from the timing generator 81. Thereafter, the electric charges are outputted as odd- and even-numbered pixel signals So, Se from odd- and even-numbered output sections 4o, 4e of FDAs (floating diffusion amplifiers) or the like through respective output terminals of the linear image sensor 1 in response to two-phase transfer clock pulses from the timing generator 81. After the odd- and even-numbered pixel signals So, Se corresponding to the pixels of one line (the number of the pixels is N=7500 in the illustrated embodiment) are outputted, a plurality of transfer clocks (corresponding to 128 odd- and even-numbered pixels in the illustrated embodiment) are supplied to the linear image sensor 1 to enable the linear image sensor 1 to output photoelectrically converted signals (odd- and even-numbered pixel signals So, Se) having levels (empty-transfer levels) of empty-transfer arrays 3o, 3e.

The odd- and even-numbered pixel signals So, Se including those photoelectrically converted signals of the empty-transfer levels are alternately supplied in the sequence of pixels through the CDS circuits 110, 111, the variable-gain amplifiers 112, 113, the A/D converters 121, 122, and the switch 123 to the offset level corrector 131, and stored in a line memory or the like in the offset level corrector 131.

Figure 4:
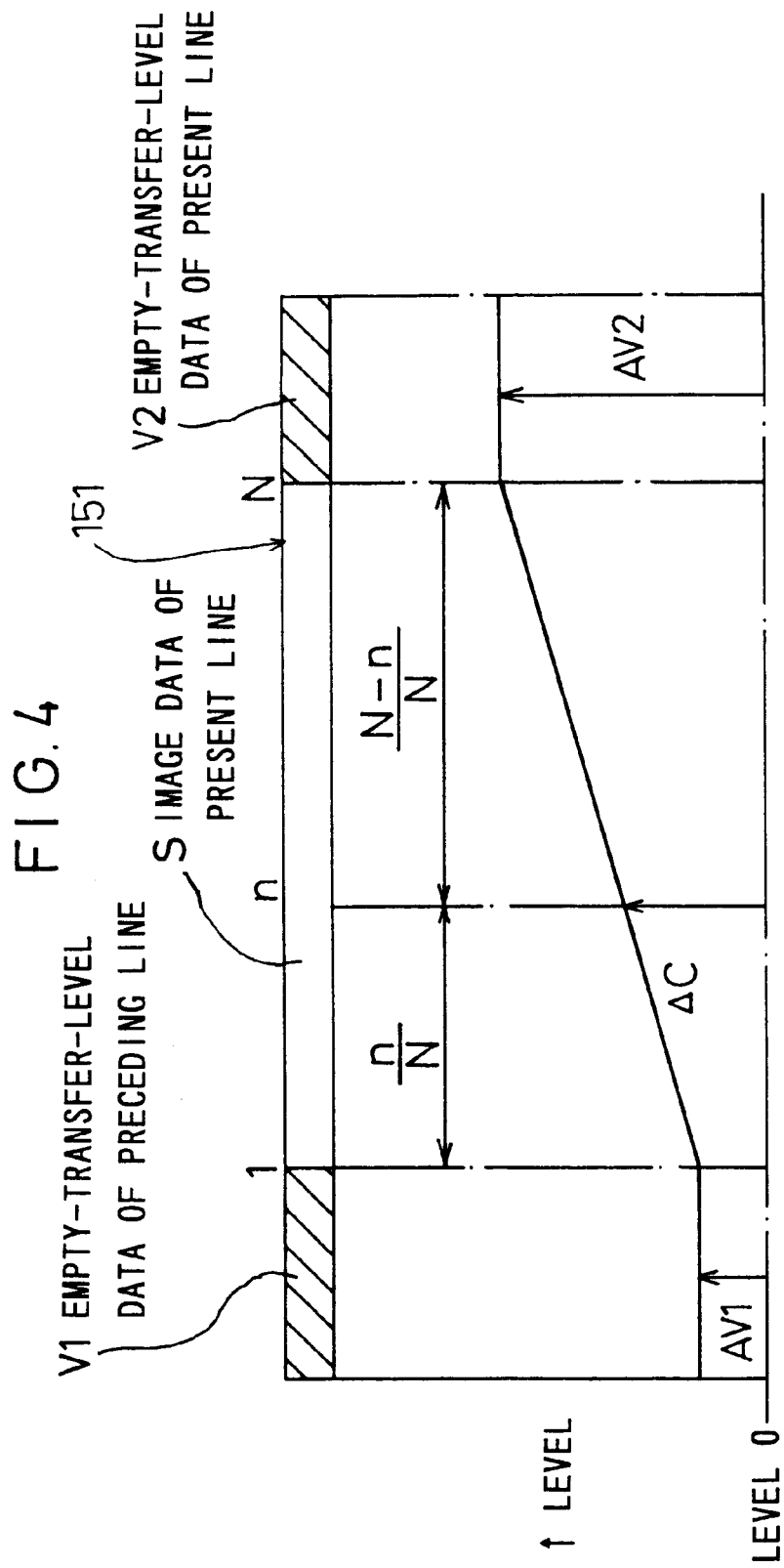
FIG. 4 is a diagram illustrative of an offset level correcting process.

FIG. 4 is illustrative of an offset level correcting process which is carried out by the offset level corrector 131. In FIG. 4, a line memory 151 stores image data S of a present line from the 7500 pixels, empty-transfer data V2 of the present line from the 128 pixels, and empty-transfer data V1 of a line preceding the present line from the 128 pixels.

The offset level corrector 131 calculates average data AV1 of the empty-transfer levels of the preceding line from the 128 pixels and also average data AV2 of the empty-transfer levels of the present line from the 128 pixels. Then, the offset level corrector 131 calculates a proportional distribution quantity (gradient average quantity, internally divided quantity) as a corrective quantity ΔC (see FIG. 4) for the pixel data S which make up the image data S of the present line, according to the following equation (1):

$$\Delta C = AV1 + (AV2 - AV1) \times n/N \tag{1}$$

where n is the pixel number of a pixel whose pixel data is to be corrected and N is the number of entire pixels of the linear image sensor 1.

Corrected pixel data (image data) S' can be obtained by subtracting the corrective quantity ΔC from the pixel data (image data) S corresponding to the pixel number n of the pixel of the present line which is to be corrected, according to the following equation (2):

$$S' = S - \Delta C \tag{2}$$

The correction of an offset level (also referred to as an offset shift) relative to empty-transfer levels is particularly effective in correcting an offset level variation which is produced when a subject F having a white area positioned centrally in a surrounding solid black area is read by the image sensor 1 and the scanning range moves from the solid black area into the white area. The image data S' which has been corrected for the offset level is supplied as image data S to the sensitivity variation corrector 132.

The sensitivity variation corrector 132 corrects sensitivity variations of the pixels of the linear image sensors 1r, 1g, 1b. In the transmissive-subject image reading system 10T, the transmitted light L having passed through the transmissive subject F is read with respect to each of the pixels. In the reflective-subject image reading system 10R, the reflected light L reflected from a white subject such as a shading plate or the like is read with respect to each of the pixels. In both the transmissive-subject image reading system 10T and the reflective-subject image reading system 10R, the light L reduced in intensity by the ND filter 105 (see FIG. 3) whose density D is D=3 that has been inserted in the optical path is read.

It is assumed that the quantity of light applied to the pixels P having respective pixel numbers i (i=1, 2, . . . , 7500) of the linear image sensor 1 is represented by E, the quantity of light produced by the shading plate is represented by E=EH (also referred to as "shading quantity of light"), the pixel data produced by the quantity EH of light and corrected for offset levels is represented by Hi (measured value), the quantity of light produced when the ND filter 105 is inserted is represented by E=ES (also referred to as "ND filter quantity of light"), and the pixel data produced by the quantity ES of light and corrected for offset levels is represented by Si (measured value).

Figure 5:
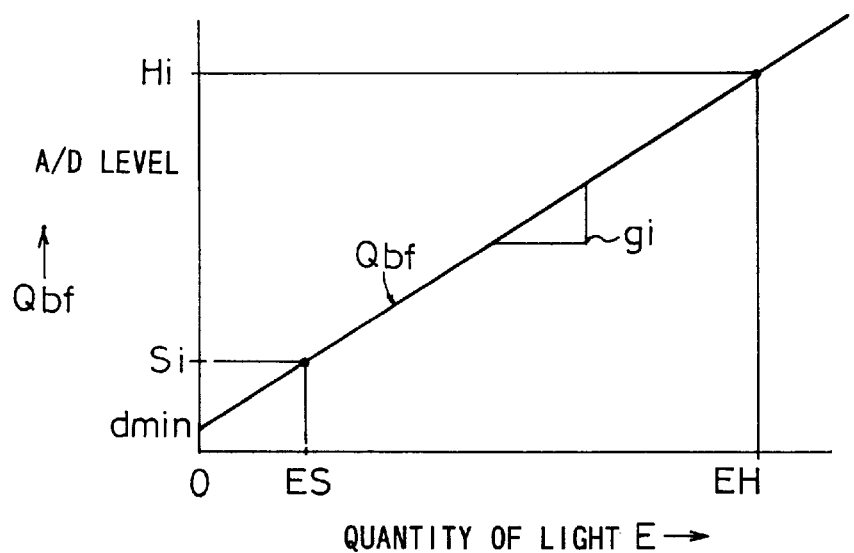
FIG. 5 is a diagram of an A/D level, before being corrected, illustrating a sensitivity correcting process.

As can be seen from FIG. 5, when the quantity E of light is applied to the pixels P, image data Qbf before it is corrected is represented by a curve which is expressed by the following equation (3):

$$Qbf = gi \times E + dmin \quad (3)$$

where gi indicates a gradient and dmin is the y-intercept. Since the quantity ES of light at two points measured with respect to each of the pixels P is 1000 times smaller than the quantity EH of light, and in view of a value of 16000 and a value of 16 which is one-thousandth of the value of 16000 because the 14-bit-resolution A/D converters 121, 122 have a resolution of 16384, the gradient gi is obtained according to the following equation (14):

$$gi = (Hi - Si)/(16000 - 16) \quad (4)$$
$$= (Hi - Si)/15984$$
$$= (Hi - Si)/(EH - ES)$$

The y-intercept dmin of the curve Qbf is calculated as follows:

$$dmin = Hi - gi \times EH \quad (5)$$

Image data Qaf which has been corrected is produced by a conversion process on the assumption that all the pixels P have the same photoelectric conversion characteristics in favor of easy signal processing. The photoelectric conversion characteristics are shown in FIG. 6.

Figure 6:
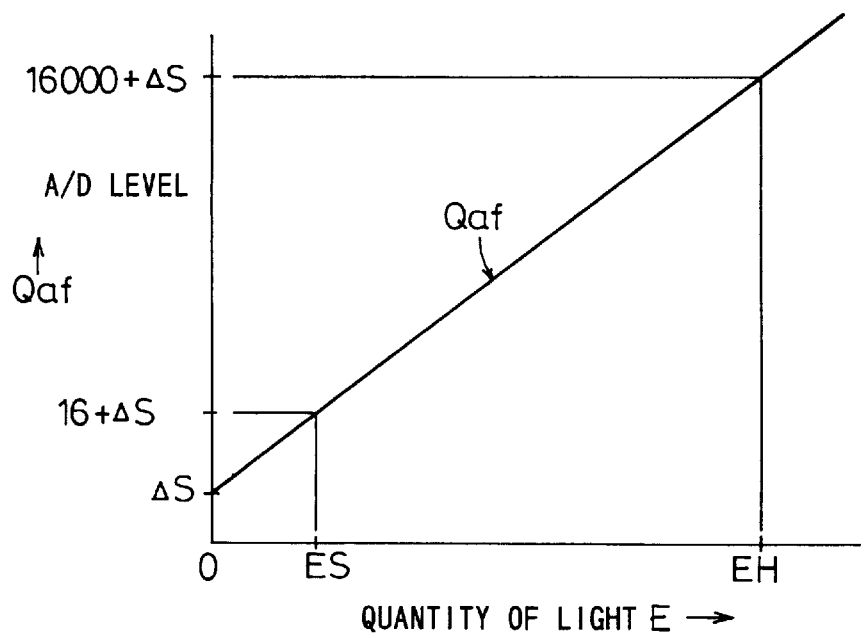
FIG. 6 is a diagram of an A/D level, after being corrected, illustrating the sensitivity correcting process.

In FIG. 6, an offset ΔS is of a positive value in view of the fact that a noise component exists even when the quantity E of light is nil, i.e., it is of a dark level. If there were no such offset ΔS, then noise whose A/D-converted level is nil or less would be removed. By setting the offset ΔS to a suitable value (ΔS>0), a true average value will be produced by a subsequent signal averaging process even in the presence of a noise component, making the density resolution sufficient in shadows. In the illustrated embodiment, the offset ΔS has an experimentally confirmed value of ΔS=40.

With the offset ΔS thus determined, the corrected image data Qaf is obtained according to the following equation (6):

$$Qaf = E + \Delta S \quad (6)$$

For converting the image data Qbf (which means the image data S corrected for offset levels) into the corrected image data Qaf, corrective data stored in a correction table (not shown) of the sensitivity variation corrector 132 include dark data DDi and shading correction data SDi. Then, the image data Qbf can be converted into the corrected image data Qaf using an adder and a multiplier, according to the following equation (7):

$$Qaf = (Qbf + DDi) \times SDi \quad (7)$$

In the equation (7), since it is necessary for the shading correction data SDi to have the same gradient as the image data Qbf, the shading correction data SDi is expressed by:

$$SDi = 1/gi = 15984/(Hi - Si) \quad (8)$$

As can easily be understood, the dark data DDi is given by the equation (9):

$$DDi = (-1) \times dmin + \Delta S \times gi \quad (9)$$

By substituting the equations (3), (8), (9) in the equation (7), the above equation (6) is obtained:

$$Qaf = (Qbf + DDi) \times SDi \quad (6)$$
$$= \{(gi \times E + dmin) - dmin + \Delta S \times gi\}/gi$$
$$= E + \Delta S$$

In this manner, the image data Qaf=S corrected for sensitivity variations with respect to each of the pixels P of the linear image sensors 1r, 1g, 1b appears at the output terminal of the sensitivity variation corrector 132.

The defective pixel corrector 133 operates when the transmitted light L having passed through the transmissive subject F is read with respect to each of the pixels or the reflected light L reflected from a white subject such as a shading plate or the like is read with respect to each of the pixels, in the same manner as the sensitivity variation SaSS corrector 132. The defective pixel corrector 133 compares the level of each pixel signal S with a predetermined threshold, and, if the level of a pixel signal S is smaller than the predetermined threshold, determines that the photoelectric transducer pixel P corresponding to the pixel signal S is a defective pixel which has a low photoelectric conversion sensitivity or is incapable of photoelectric conversion. The defective pixel corrector 133 stores the pixel number of the defective pixel in a defective pixel table. When the pixel signal S produced by the defective pixel will subsequently be inputted, the defective pixel corrector 133 outputs, in place of the inputted pixel signal S, a pixel signal S {S=(Sp+Sa)/2} having a level which is represented by the average of the levels Sp, Sa of pixel signals S which precede and follow the inputted pixel signal S.

Figure 7:
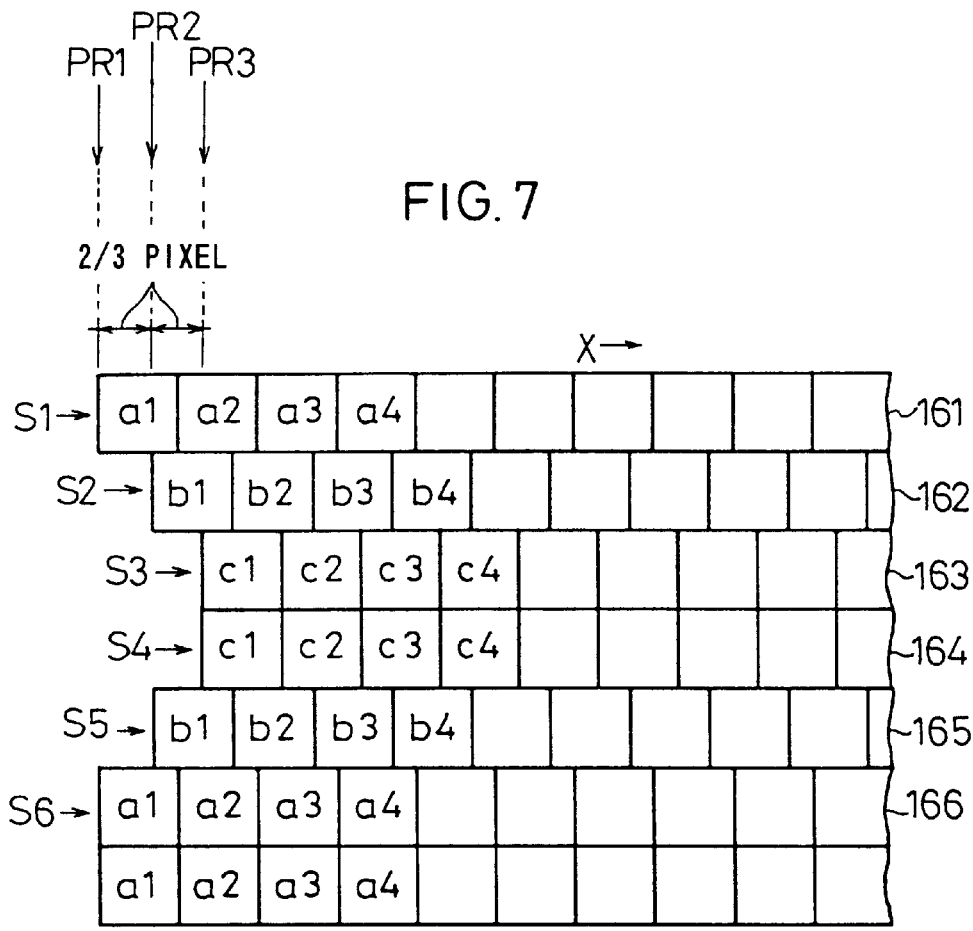
FIG. 7 is a diagram of 2/3 pixel displacements, illustrating a resolution correcting process.

The resolution corrector 134 as it is incorporated in the transmissive-subject image reading system 10T operates as follows: When the subject F is to be read each line in the main scanning direction X, i.e., in the direction X shown in FIG. 7, the CPU 82 energizes the piezoelectric device 27 to move each linear image sensor 1 to a reference position PR1 (no displacement), a position PR2 which is a 2/3 pixel pitch displaced from the reference position PR1, and a position PR3 which is a 2/3 pixel pitch displaced from the position PR2. The subject F is read with respect to each of the pixels with the linear image sensor 1 at each of the above positions PR1, PR2, PR3. The resolution corrector 134 stores image data S1, S2, S3 produced from the linear image sensor 1 at the respective positions PR1, PR2, PR3 into respective line memories 161, 162, 163 each having 7500 memory addresses corresponding to the photoelectric transducer pixels of one line of the linear image sensor 1. In FIG. 7, the first pixel data of the image data S1 has a value of a1.

When the subject F is to be read each line in a direction opposite to the direction X, the CPU 82 energizes the piezoelectric device 27 to move each linear image sensor 1 to the position PR which is a 4/3 pixel pitch from the reference position PR1, the position PR 2 which is a 2/3 pixel pitch displaced from the reference position PR1, and the reference position PR1. The subject F is read with respect to each of the pixels with the linear image sensor 1 at each of the above positions PR3, PR2, PR1. The resolution corrector 134 stores image data S4, S5, S6 produced from the linear image sensor 1 at the respective positions PR3, PR2, PR1 into respective line memories 164, 165, 166 each having 7500 memory addresses.

Figure 8:
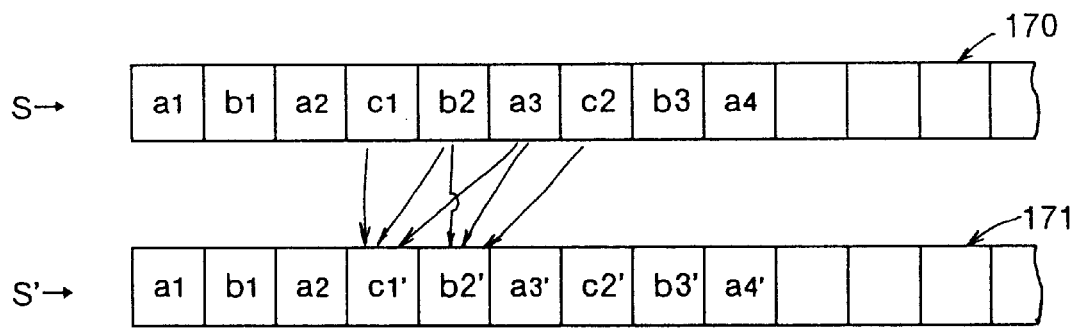
FIG. 8 is a diagram of image data after it has been subjected to the resolution correcting process.
Figure 9:
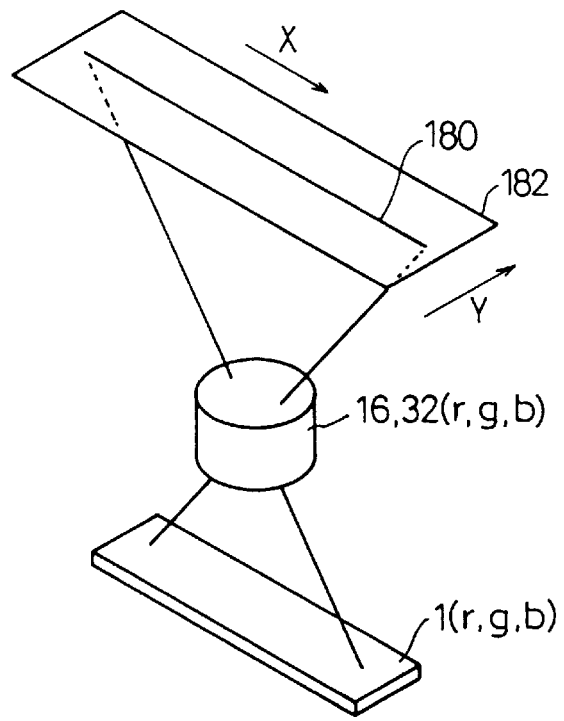
FIG. 9 is a schematic perspective view illustrative of an auxiliary scanning curvature correcting process.

As shown in FIG. 8, the actual image data S of a first line comprises the pixel data of the image data S1~S3 which are arrayed in the order of displacements (the pixel data a1, b1, a2, c1 . . . are successively arranged in the order named from the leftmost position in FIG. 7) and stored in a line memory 170 which has 22500 memory addresses that are three times more than the photoelectric transducer pixels of one line of the linear image sensor 1. The actual image data S of a second line comprises the pixel data of the image data S4~S6 which are arrayed in the order of displacements, although not shown in FIG. 8. The pixel data thus arranged and stored for each line make the resolution of a reproduced image three times greater than would if they were not thus arranged and stored.

However, when the resolution is increased three times in the above manner, reproduced image edges may suffer irregularities along the main scanning direction X due to the increased resolution. To eliminate such irregularities, image data S' (see those stored in a line memory 171 in FIG. 8) are produced when the image data S stored in the line memory 170 are processed by a moving average calculating process over three pixels, and outputted as resolution-increased image data S. In an actual application, the first through third pixel data a1, b1, a2 are not used in the moving average calculating process because they are positioned in an irregular pattern compared with the fourth and following pixel data c1, b2, a3, c2 . . . .

Fourth pixel data c1' stored in the line memory 171 is of a value expressed according to the equation (10) shown below, and fifth pixel data b2' stored in the line memory 171 is of a value expressed according to the equation (11) shown below. The other pixel data a3', c2', . . . produced by the moving average calculating process are calculated in a similar fashion.

$$c1'=(c1+b2+a3)/3 \quad (10)$$

$$b2'=(b2+a3+c2)/3 \quad (11)$$

In the illustrated embodiment, the linear image sensor 1 is moved to positions that are displaced a 2/3 pixel pitch from each other. However, the linear image sensor 1 may be displaced a distance different from the 2/3 pixel pitch insofar as the displacement is smaller than the distance between two adjacent photoelectric transducer pixels, i.e., the pixel pitch Pp. Generally, if it is assumed that the pixel pitch between two adjacent photoelectric transducer pixels is indicated by Pp, then the piezoelectric device 27 may be controlled to displace the linear image sensor 1 in the main scanning direction X by a distance M:

$$M=Pp \times q \times 2/(2 \times m+1) \quad (m: \text{an integer of 1 or greater}) \quad (12)$$

where q varies successively from a value of 0 to a value of 2m after each line, for thereby increasing the resolution. Then, successive (2m+1) pixel signals of the image signal whose resolution has been increased are processed by a moving average calculating process, thereby generating final pixel signals. In this case, the resolution is increased from the level of a pixel signal from a single pixel of the linear image sensor to the level of (2m+1) pixel signals.

For example, when m is m=1, q is q=0, 1, 2, and hence the distance M of displacement is a 2/3 pixel pitch between the positions M=0, Pp×2/3, Pp×4/3, so that the resolution is (2m+1)=(2×1+1)=3 times. When m is m=2, q is q=0, 1, 2, 3, 4, and hence the distance M of displacement is a 2/5 pixel pitch between the positions M=0, Pp×2/5, Pp×4/5, Pp×6/5, Pp×8/5, so that the resolution is (2m+1)=(2×2+1)=5 times.

The image signal S with the resolution thus increased is supplied to the auxiliary scanning curvature/odd- and even-numbered pixel level difference corrector 135. Inasmuch as the correcting processes carried out by the auxiliary scanning curvature/odd- and even-numbered pixel level difference corrector 135 and subsequent correctors cannot simply be explained with respect to the image signal S with the resolution increased for an easy understanding, those correcting processes will be described with respect to the image signal S corrected by the defective pixel corrector 133 before its resolution is increased.

In the correcting process performed by the auxiliary scanning curvature corrector 136, a test chart 182 (see FIG. 9) marked with a linear image (transverse line) 180 extending in the main scanning direction X is placed as the transmissive subject FT in the subject cassette 12 as shown in FIG. 1, or placed as the reflective subject FR on the subject table 52 as shown in FIG. 2. Then, a certain range of the test chart 182 including the linear image 180 in the auxiliary scanning direction Y is read by the linear image sensors 1r, 1g, 1b through the focusing optical system 16 and the tricolor separating prisms 32r, 32g, 32b.

The linear image 180 has a thickness in the auxiliary scanning direction Y which corresponds to several pixels. The linear image 180 is black in color, but may be gray. Alternatively, the test chart 182 may be entirely black in color, and the linear image 180 may be white (when used as the reflective subject FR) or transparent (when used as the transmissive subject FT). The linear image 130 on the test chart 182 is achromatic in order to equalize the levels of output signals from the linear image sensors 1r, 1g, 1b.

The range of the test chart 182 in the auxiliary scanning direction Y is determined from the readout resolution (in dots/mm) in the auxiliary scanning direction Y, the magnification of the optical system, and the amount of curvature of the linear image sensor 1. In this embodiment, the range of the test chart 182 in the auxiliary scanning direction Y corresponds to data of 16 lines (16 main scanning lines) for each of the linear image sensors 1r, 1g, 1b.

When that range of the test chart 182 is read, image data files each comprising 7500 pixels×16 lines are generated from the image data read by the respective linear image sensors 1r, 1g, 1b.

Figure 10:
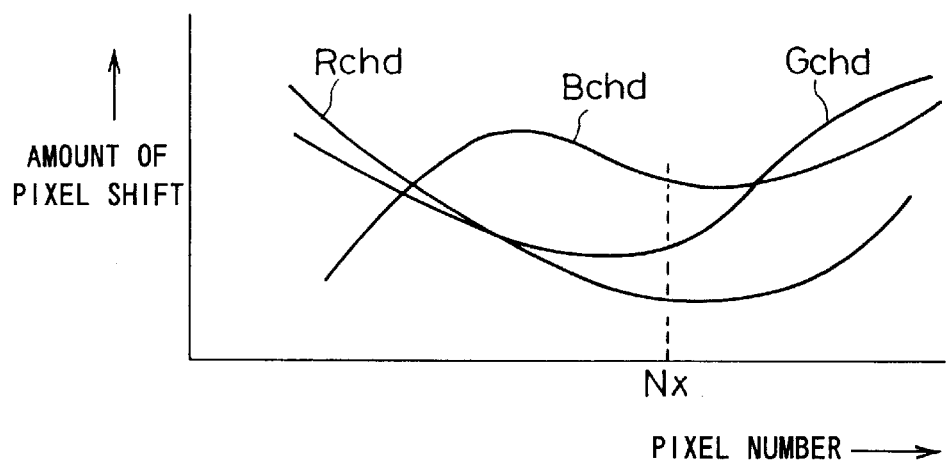
FIG. 10 is a diagram illustrative of curvatures in an auxiliary scanning direction of linear image sensors.

Each of the image data files stores 14-bit image data S in each address. The image data stored in the image data files are schematically shown in FIG. 10. It will be seen from FIG. 10 that auxiliary scanning curvature characteristics Rchd, Gchd, Bchd obtained from the image data produced by the linear image sensors 1r, 1g, 1b are smoothly curved in the main scanning direction X in which adjacent pixels are joined, but are not related to each other between the R, G, B channels which correspond to the linear image sensors 1r, 1g, 1b.

Pixel shifts (positional shifts) in the auxiliary scanning direction Y will be calculated below. The linear image sensor of any arbitrary color, i.e., the linear image sensor 1g of the color G (green) in this embodiment, is used as a reference, and pixel shifts corresponding to color shifts in the auxiliary scanning direction Y between the pixels of the linear image sensor 1g and the pixels having the same pixel numbers of the remaining linear image sensors 1r, 1b are calculated in 0.1 pixel units for each of the pixel numbers from the image data contained in the image data file.

The calculated pixel shifts of the B channel with respect to the reference G channel and the calculated pixel shifts of the R channel with respect to the reference G channel are then stored in a pixel shift correction table. When image information carried by the subject F is actually read as image data by the linear image sensors 1r, 1g, 1b, the read image data are corrected on the basis of the pixel shift correction table. For example, if the pixel shift of a pixel stored in the pixel shift correction table corresponds to 2.5 pixels, then the pixel signal from a pixel which is two pixels apart from the pixel in question in the auxiliary scanning direction Y and the pixel signal from a pixel which is three pixels apart from the pixel in question in the auxiliary scanning direction Y are averaged, and the average is outputted as a corrected pixel signal for that pixel in question.

Figure 11:
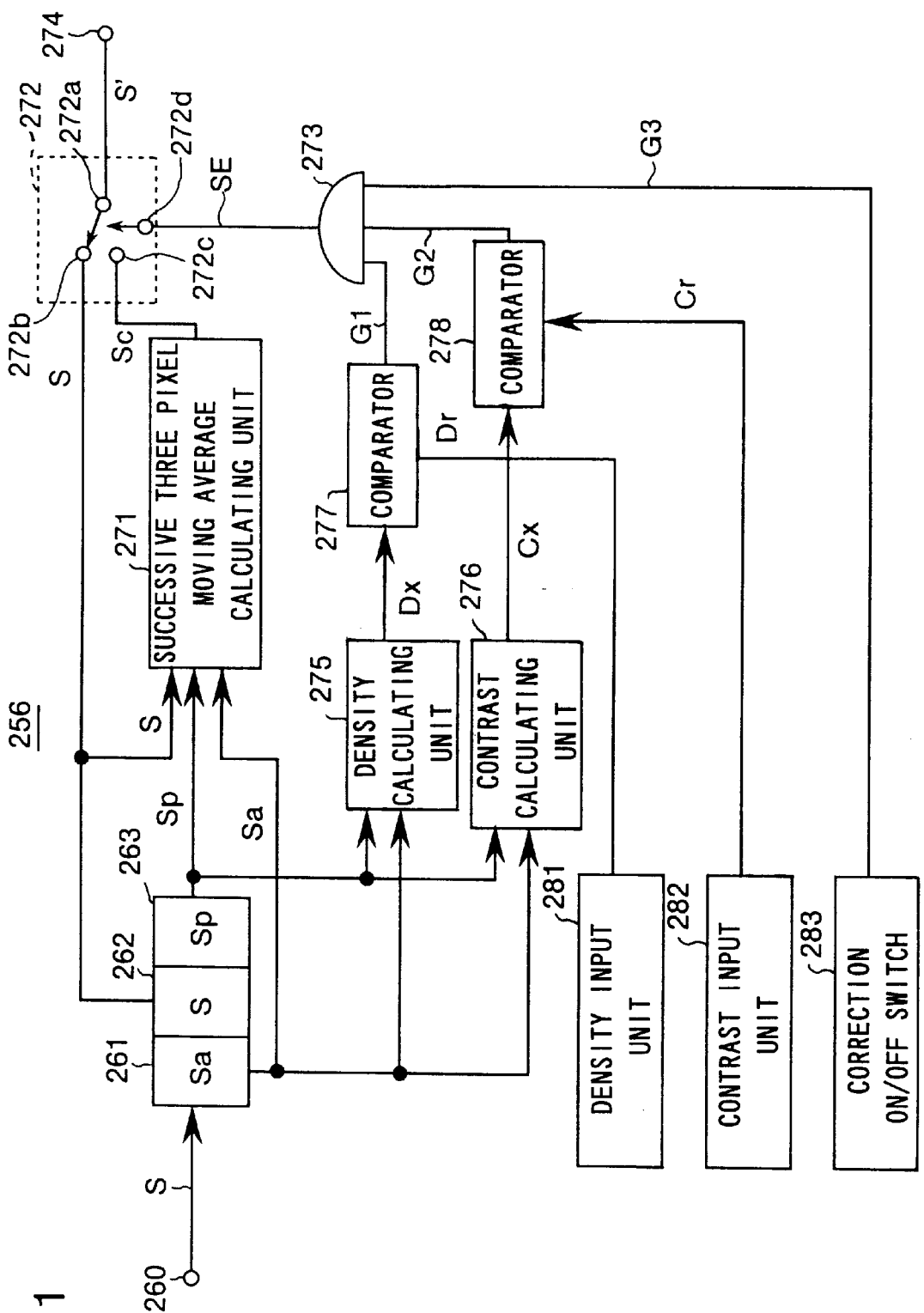
FIG. 11 is a block diagram of an arrangement for carrying out an odd- and even-numbered pixel level difference correcting process.

The odd- and even-numbered pixel level difference corrector 137 has a correction circuit 256 shown in FIG. 11 for carrying out an odd- and even-numbered pixel level difference correcting process.

As shown in FIG. 11, three successive pixel signals Sp, S, Sa (whose levels are also denoted by Sp, S, Sa) making up an image signal S of one line are supplied from an input terminal 260 and successively stored in respective registers 261, 262, 263. The pixel signal Sp precedes the pixel signal S, and the pixel signal Sa precedes the pixel signal S.

For generating a corrected pixel signal S' from the pixel signal S, a successive three pixel weighted moving average calculating unit 271 calculates a weighted moving average signal Sc of the three successive pixels S, Sp, Sa according to the equation (13), given below.

$$Sc = \{S + (Sp + Sa)/2\}/2 \quad (13)$$
$$= (Sp + 2S + Sa)/4$$

Then, a density calculating unit 275 calculates a density dependent signal Dx (which is the same as the average of the preceding and following pixel signals Sp, Sa) from the pixel signals Sp, Sa according to the equation (14), given below.

$$Dx = (Sp+Sa)/2 \quad (14)$$

In view of the fact that the MTF of the human visual perception is high when the density of an image is high, when the density represented by the density dependent signal Dx is higher than a reference density level Dr inputted from a density input unit 281, i.e., when the density D=1.0 or the corresponding luminance is lower than a reference luminance level Dr=1000 (at this time, a binary signal G1 from a comparator 277 goes high), and when the level of a contrast dependent signal Cx obtained as the difference between the preceding and following pixel signals Sp, Sa from a contrast calculating unit 276 is smaller than a reference contrast level Cr inputted from a contrast input unit 282 (at this time, a binary signal G2 from a comparator 278 goes high), and when a correction on/off switch 283 is turned on to render a binary signal G3 high, a switch control signal SE outputted from an AND gate 273 goes high. At this time, a common contact 272a of a switch 272 is connected to a fixed contact 272c by the switch control signal SE supplied to a control terminal 272d of the switch 272, supplying the weighted moving average signal Sc from the successive three pixel weighted moving average calculating unit 271 as the corrected pixel signal S' to an output terminal 274.

If the contrast Cs is smaller than the reference contrast Cr, then since the density difference (luminance difference) is small, periodic longitudinal stripes would tend to be reproduced in a reproduced image due to the differences between the levels of odd- and even-numbered pixels.

The odd- and even-numbered pixel level difference correcting process carried out by the correction circuit 256 shown in FIG. 11 is effective to eliminate such periodic longitudinal stripes. Because the corrected pixel signal S'=Sc is a moving average signal over three pixels including the pixel in question, the corrected pixel signal S'=Sc has its center of gravity prevented from being positionally shifted.

When the density dependent signal Dx is smaller than the reference density level Dr (in highlights of the subject) or when the contrast dependent signal Cx is greater than the reference contrast level Cr, the switch control signal SE goes low, connecting the common contact 272a to a fixed contact 272b of the switch 272. At this time, the pixel signal S'=S which is not subject to the three pixel weighted moving average calculating process is supplied to the terminal 274. In this manner, the reproduced image remains as sharp as the original image. Final values of the reference density level Dr and the contrast density level Cr should preferably be determined through image quality evaluations in view of the overall characteristics of the image reading and platemaking system.

As described above, the main scanning aberration/magnification corrector 138 may perform a known process of reading a reference chart having marks spaced at equal intervals in the main scanning direction X with the image sensors 1r, 1g, 1b and correcting an image signal representing the marks based on theoretical data (which may be considered as representing a reference magnification) for thereby correcting the image signal representing the marks on the reference chart. (see Japanese patent publication No. 4-48844 or Japanese patent publication No. 6-85556).

In this embodiment, more specifically, a reference chart printed with 25 black marks spaced at equal intervals of 4.5 mm in the main scanning direction X is read by the linear image sensors 1r, 1g, 1b, and magnification correction coefficients in the main scanning direction X for the pixels of the linear image sensors 1r, 1g, 1b are determined such that the number of pixels between the marks is equal to a number corresponding to the theoretical data (representing the number of pixels between adjacent marks). The determined magnification correction coefficients are stored in a magnification correction coefficient table at respective addresses associated with the pixels for subsequently electrically correcting magnifications with respect to the respective pixels. After the magnification correction coefficient table is generated, the magnifications of the pixels in the main scanning direction X are corrected with respect to image signals which are produced by the image sensors 1r, 1g, 1b, according to the magnification correction coefficients stored in the magnification correction coefficient table. Since the magnification correction coefficient table contains data relative to aberrations of the optical components including the zoom lens of the focusing optical system 16, the magnification correction coefficient table may also be regarded as an aberration correction table.

When pixel signals produced by the pixels of the linear image sensors are corrected for the aberrations and magnifications in the main scanning direction X, color shifts in the main scanning direction on reproduced images are eliminated.

Figure 12:
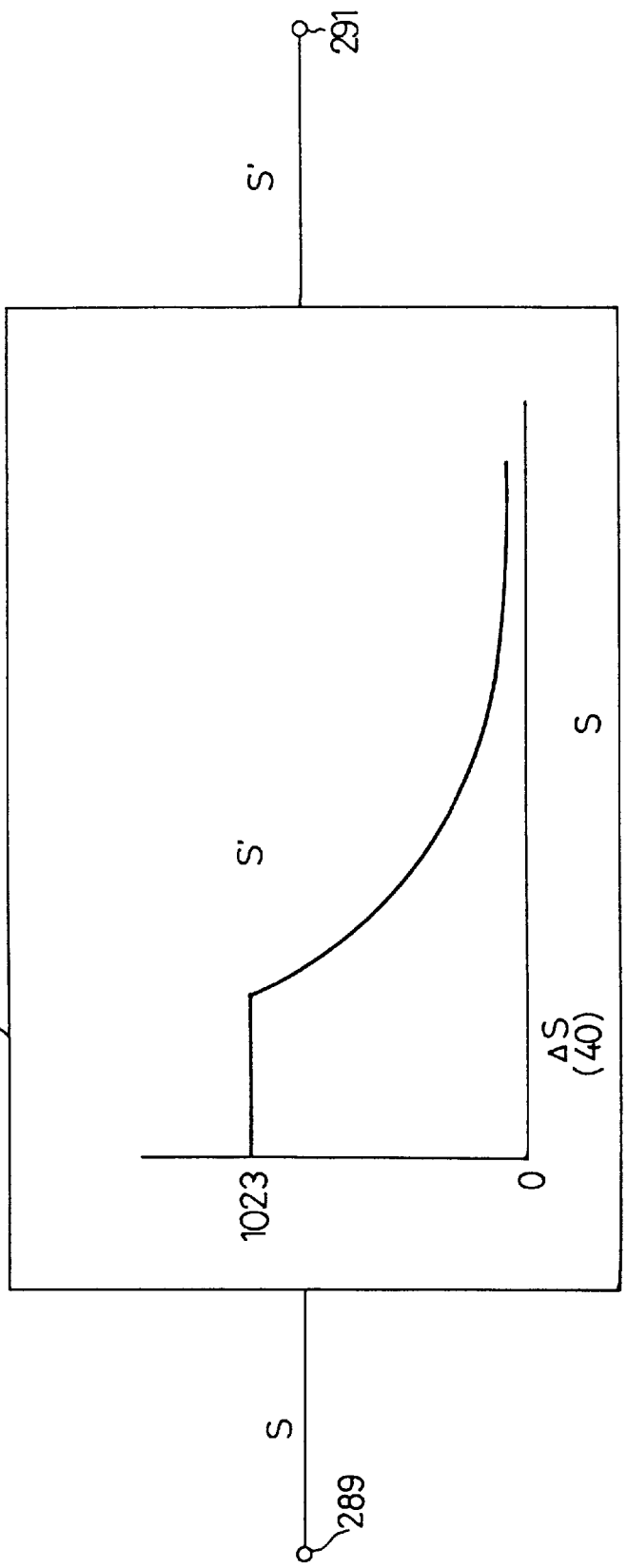
FIG. 12 is a diagram illustrative of a luminance-to-density conversion correcting process.

The luminance-to-density conversion corrector 139 has a luminance-to-density conversion table 290 shown in FIG. 12 which has an input terminal 289 supplied with a 14-bit luminance-level image signal S linearly representing the quantity of light applied to the linear image sensor 1. The luminance-to-density conversion table 290 converts the supplied luminance-level image signal S into a 10-bit density-level image signal S', which is outputted from an output terminal 291. Stated otherwise, the luminance-to-density conversion table 290 converts positive image data into negative image data for subsequent conversion into halftone-dot % data. The luminance-to-density conversion table 290 stores density-level image signals S' which are related to luminance-level image signals S as follows:

$$S'=(1023/3.6)\times\log_{10}(16000/S) \quad (15)$$

Since the density-level image signals S' in the equation (15) are basically the corrected image data Qaf expressed by the equation (6) above, they are of the offset $\Delta S=40$ when the quantity E of light is nil, i.e., it is of a dark level, and of a value 16000+40 when the quantity E of light is maximum. In the luminance-to-density conversion table 290 shown in FIG. 12, values 0~1023 on the vertical axis corresponding to density values 0~3.6.

Figure 13:
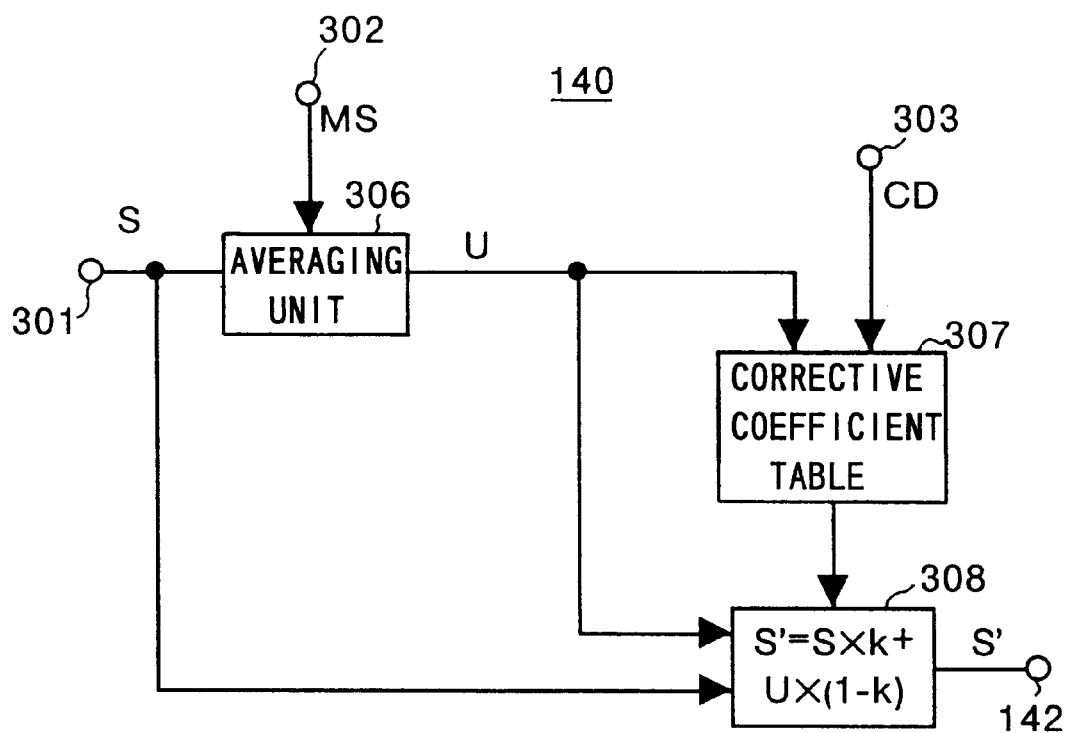
FIG. 13 is a block diagram of an arrangement for carrying out a density-dependent averaging correcting process.

The density-dependent averaging corrector 140 has a circuit arrangement as shown in FIG. 13.

Specifically, the density-dependent averaging corrector 140 includes an averaging unit 306 for outputting an average signal U from an image signal S supplied from an input terminal 301 and a corrective coefficient table 307 for outputting a corrective coefficient k. The averaging unit 306 is supplied with a mask size MS indicated by the keyboard 83 and established by the CPU 82, through an input terminal 302. The corrective coefficient table 307 is supplied with a density-dependent coefficient designating signal CD indicated by the keyboard 83 and established by the CPU 82, through an input terminal 303.

The density-dependent averaging corrector 140 also has a correction circuit 308 for outputting a density-dependent averaged image signal S' to an output terminal 142. The density-dependent averaged image signal S' is expressed as follows:

$$S'=S\times k+U\times(1-k) \quad (16)$$

The equation (16) calculated by the correction circuit 308 will be described in detail below.

A shadow area of the subject F is an area where the S/N ratio is poor because of a reduced luminance signal level. When the S/N ratio is poor, a reproduced image suffers a coarse feature and hence a poor image quality. It is known that the noise component outputted from the linear image sensors 1 is most responsible for the coarse feature. Since the noise component is random noise, it is effective to reduce the coarse feature by averaging pixel signals with a predetermined mask size MS (ranging from a size of 1 pixel×1 pixel to a size of 4 pixels×4 pixels). The averaging unit 306 produces an average signal U with the mask size MS. However, the averaging process effected by the averaging unit 306 degrades MTF characteristics which is a frequency response of the image signal.

In a highlight area, any degradation of the MTF of the human visual perception can be confirmed more easily than in a shadow area, but the coarse feature is less visually recognized.

Therefore, in a highlight area where the density level of the image signal S is lower, the density-dependent averaging corrector 140 outputs the supplied image signal S directly as a corrected image signal S' (k=1), and in an area where the density level of the image signal S is higher, the density-dependent averaging corrector 140 outputs an image signal S' corrected using the average signal U. In this manner, the coarse feature of the shadow area of the image is improved while maintaining the MTF characteristics in the highlight area of the image. The mask size MS and the density-dependent coefficient designating signal CD may be set to optimum values depending on processing conditions for the subject F, particularly designated values for the magnifications and resolution, after the magnifications and resolution are corrected.

According to the illustrated embodiment, light L which bears image information carried by the subject F is two-dimensionally read through the tricolor separating optical systems 32 (32r, 32g, 32b) by the linear image sensors 1 (1r, 1g, 1b) for the three colors R, G, B, and the odd- and even-numbered pixel signals So, Se outputted from the linear image sensors 1 are alternately read to produce an image signal S which comprises a series of pixel signals. For correcting the image signal S into a high-quality image signal S' to accurately reproduce the image of the subject F as a printed or displayed image, the image signal S is corrected successively by the offset level corrector 131, the sensitivity variation corrector 132, the auxiliary scanning curvature/odd- and even-numbered pixel level difference corrector 135, the main scanning aberration/magnification corrector 138, and the luminance-to-density conversion corrector 139 (referred to as a first basic processing sequence). In this manner, it is possible to obtain a corrected image signal S' capable of reproducing a high-quality output image.

The image signal S may be corrected successively by the offset level corrector 131, the sensitivity variation corrector 132, the auxiliary scanning curvature/odd- and even-numbered pixel level difference/luminance-to-density conversion corrector 141, and the main scanning aberration/magnification corrector 138 (referred to as a second basic processing sequence) for thereby producing a corrected image signal S' capable of reproducing a high-quality output image.

Alternatively, the image signal S may be corrected successively by the defective pixel corrector 133 and the resolution corrector 134 immediately after being corrected by the sensitivity variation corrector 132 for thereby producing a corrected image signal S' capable of reproducing a high-quality output image.

In the first basic processing sequence, the image signal S is corrected by the density-dependent averaging corrector 140 after being corrected by the luminance-to-density conversion corrector 139. In the second basic processing sequence, the image signal S is corrected by the density-dependent averaging corrector 140 after being corrected by the auxiliary scanning curvature/odd- and even-numbered pixel level difference/luminance-to-density conversion corrector 141 for thereby producing a corrected image signal S' capable of reproducing a high-quality output image.

The above processing sequences offer the following advantages:

(1) The offset level corrector 131 can eliminate an undesirable offset level variation, i.e., an offset shift component, produced by the pixel transfer array when a high-density subject with a white blank area is read.

(2) The sensitivity variation corrector 132 can eliminate shortcomings due to different sensitivities of pixels of linear image sensors.

(3) The defective pixel corrector 133 can eliminate drawbacks due to the presence of defective pixels.

(4) The resolution corrector 134 can meet demands for increasing the resolution of linear image sensors.

(5) The auxiliary scanning curvature corrector 136 can eliminate color shifts produced in a reproduced image due to a curvature in the auxiliary scanning direction of the photodetector of linear image sensors (joined areas of photoelectric transducer pixels).

(6) The odd- and even-numbered pixel level difference corrector 137 can eliminate deficiencies which occur when the odd-numbered pixels and the even-numbered pixels have different linearity characteristics.

(7) The main scanning aberration/magnification corrector 138 can solve problems which are caused when the pixels have different magnifications in the main scanning direction.

(8) The luminance-to-density conversion corrector 139 and the density-dependent averaging corrector 140 can eliminate noise which may be introduced when a luminance signal is converted into a density signal.

(9) The luminance-to-density conversion corrector 139 and the density-dependent averaging corrector 140 can eliminate a coarse feature introduced in a reproduced image by noise of the linear image sensors when they read a high-density-level area of the subject where a luminance signal level is low.

As described above, when an inputted image signal is corrected by a succession of correcting processes, a corrected image signal can be produced for reproducing a high-gradation, high-quality image.

Although certain preferred embodiments of the present invention has been shown and described in detail, it should be understood that various changes and modifications may be made therein without departing from the scope of the appended claims.

What is claimed is:

1. A method of correcting an image signal produced by introducing light which bears image information carried by a subject into tricolor separating optical systems, reading the light one line at a time in a main scanning direction with linear image sensors for the three colors R, G, B, integral with the tricolor separating optical systems, moving the subject in an auxiliary scanning direction relatively to the tricolor separating optical systems for thereby two-dimensionally reading the image information carried by the subject, and alternately reading odd- and even-numbered pixel signals outputted from the linear image sensors 1 to produce the image signal which comprises a series of pixel signals, said method comprising the steps of:

correcting an offset of each of the pixel signals of an image signal of a present line by supplying a transfer clock signal to determine an empty-transfer level after the pixel images of each line are read and calculating a corrective quantity for each of the pixel signals with a gradient average of an empty-transfer level of a preceding line and an empty-transfer level of the present line;

correcting sensitivity variations of the pixels of the linear image sensors based on image signals produced when a white or transparent subject is read directly and through a filter having a predetermined density;

correcting an auxiliary scanning curvature and odd- and even-numbered pixel level differences of the image signal by reading a subject carrying a linear image extending in the main scanning direction for successive lines with the image sensors, thereafter determining and correcting pixel shifts in the auxiliary scanning direction of two of the linear image sensors with respect to the remaining one of the linear image sensor used as a reference, and selectively outputting pixel signals which are to be corrected or pixel signals which have been corrected based on averages of and differences between the levels of the pixel signals which are to be corrected and the pixel signals which have been corrected for thereby correcting variations in the levels of the odd- and even-numbered pixel signals;

correcting aberrations and magnifications in the main scanning direction by reading a reference chart having marks spaced at equal intervals in the main scanning direction with the linear image sensors and thereafter calculating electric magnification correction coefficients with respect to the respective pixels such that reproduced images of the marks based on an image signal representative of the read marks will be spaced at equal intervals; and converting a luminance-level image signal produced by the linear image sensors into a density-level image signal with a luminance-to-density conversion table.

2. A method according to claim 1, further comprising the step of:

after converting the luminance-level image signal, correcting the image signal for density-dependent averaging by outputting the image signal (S) as it is if the density level of the image signal (S) after being converted into the density-level image signal is low, and outputting an image signal (S') expressed by $S'=S=k+U\times(1-k)$ where k is a corrective coefficient (ranging from 0 to 1) depending on the level of an image signal (U) produced when the image signal (S) is averaged with a predetermined mask size if the density level of the image signal (S) is high.

3. A method according to claim 1, further comprising L the steps of:

immediately before correcting the auxiliary scanning curvature and odd- and even-numbered pixel level differences of the image signal, increasing the resolution of the image signal by displacing the linear image sensors in the main scanning direction by successively varying q from 0 to 2m for each line in $Pp\cdot q\cdot 2/(2\cdot m+1)$ where Pp represents the distance between the centers of adjacent pixels and m an integer of 1 or greater when the subject is read each line in the main scanning direction, for thereby increasing the resolution $(2\cdot m+1)$ times, and thereafter calculating a moving average of successive $(2\cdot m+1)$ pixel signals of the image signal whose resolution has been increased to produce a final image signal whose resolution has been increased; and immediately after converting the luminance-level image signal, correcting the image signal for density-dependent averaging by outputting the image signal (S) as it is if the density level of the image signal (S) after being converted into the density-level image signal is low, and outputting an image signal (S') expressed by S'=S×k+U×(1−k) where k is a corrective coefficient (ranging from 0 to 1) depending on the level of an image signal (U) produced when the image signal (S) is averaged with a predetermined mask size if the density level of the image signal (S) is high.

4. A method of correcting an image signal produced by introducing light which bears image information carried by a subject into tricolor separating optical systems, reading the light one line at a time in a main scanning direction with linear image sensors for the three colors, integral with the tricolor separating optical systems, moving the subject in an auxiliary scanning direction relatively to the tricolor separating optical systems for thereby two-dimensionally reading the image information carried by the subject, and alternately reading odd- and even-numbered pixel signals outputted from the linear image sensors to produce the image signal which comprises a series of pixel signals, said method comprising the steps of:

correcting an offset of each of the pixel signals of an image signal of a present line by supplying a transfer clock signal to determine an empty-transfer level after the pixel images of each line are read and calculating a corrective quantity for each of the pixel signals with a gradient average of an empty-transfer level of a preceding line and an empty-transfer level of the present line;

correcting sensitivity variations of the pixels of the linear image sensors based on image signals produced when a white or transparent subject is read directly and through a filter having a predetermined density;

correcting an auxiliary scanning curvature and odd- and even-numbered pixel level differences of the image signal by reading a subject carrying a linear image extending in the main scanning direction for successive lines with the image sensors, thereafter determining and correcting pixel shifts in the auxiliary scanning direction of two of the linear image sensors with respect to the remaining one of the linear image sensor used as a reference, and selectively outputting pixel signals which are to be corrected or pixel signals which have been corrected based on averages of and differences between the levels of the pixel signals which are to be corrected and the pixel signals which have been corrected for thereby correcting variations in the levels of the odd- and even-numbered pixel signals, and converting a luminance-level image signal produced by the linear image sensors into a density-level image signal with a luminance-to-density conversion table; and correcting aberrations and magnifications in the main scanning direction by reading a reference chart having marks spaced at equal intervals in the main scanning direction with the linear image sensors and thereafter calculating electric magnification correction coefficients with respect to the respective pixels such that reproduced images of the marks based on an image signal representative of the read marks will be spaced at equal intervals.

5. A method according to claim 4, further comprising the step of:

after correcting the auxiliary scanning curvature and odd- and even-numbered pixel level differences of the image signal and converting the luminance-level image signal into the density-level image signal, or after correcting the aberrations and magnifications, correcting the image signal for density-dependent averaging by outputting the image signal (S) as it is if the density level of the image signal (S) after being converted into the density-level image signal is low, and outputting an image signal (S') expressed by S'=S×k+U×(1−k) where k is a corrective coefficient (ranging from 0 to 1) depending on the level of an image signal (U) produced when the image signal (S) is averaged with a predetermined mask size if the density level of the image signal (S) is high.

6. A method according to claim 4, further comprising the steps of:

immediately before correcting the auxiliary scanning curvature and odd- and even-numbered pixel level differences of the image signal and converting the luminance-level image signal into the density-level image signal, increasing the resolution of the image signal by displacing the linear image sensors in the main scanning direction by successively varying q from 0 to 2m for each line in Pp·q·2/(2·m+1) where Pp represents the distance between the centers of adjacent pixels and m an integer of 1 or greater when the subject is read each line in the main scanning direction, and dividing the pixel signal of each of the pixels of the linear image sensors into (2·m+1) pixel signals produced by calculating a moving average of successive 0, 1·2/(2·m+1), . . . , 2m·2/(2·m+1) pixel signals; and after correcting the auxiliary scanning curvature and odd- and even-numbered pixel level differences of the image signal and converting the luminance-level image signal into the density-level image signal, correcting the image signal for density-dependent averaging by outputting the image signal (S) as it is if the density level of the image signal (S) after being converted into the density-level image signal is low, and outputting an image signal (S') expressed by S'=S×k+U×(1−k) where k is a corrective coefficient (ranging from 0 to 1) depending on the level of an image signal (U) produced when the image signal (S) is averaged with a predetermined mask size if the density level of the image signal (S) is high.

7. A method of correcting an image signal produced by introducing light which bears image information carried by a subject into tricolor separating optical systems, reading the light one line at a time in a main scanning direction with linear image sensors for the three colors, integral with the tricolor separating optical systems, moving the subject in an auxiliary scanning direction relatively to the tricolor separating optical systems for thereby two-dimensionally reading the image information carried by the subject, and alternately reading odd- and even-numbered pixel signals outputted from the linear image sensors to produce the image signal which comprises a series of pixel signals, said method comprising the steps of:

correcting an offset of each of the pixel signals of an image signal of a present line by supplying a transfer clock signal to determine an empty-transfer level after the pixel images of each line are read and calculating a corrective quantity for each of the pixel signals with a gradient average of an empty-transfer level of a preceding line and an empty-transfer level of the present line;

correcting sensitivity variations of the pixels of the linear image sensors based on image signals produced when a white or transparent subject is read directly and through a filter having a predetermined density;

correcting an auxiliary scanning curvature and odd- and even-numbered pixel level differences of the image signal by reading a subject carrying a linear image extending in the main scanning direction for successive lines with the image sensors, thereafter determining and correcting pixel shifts in the auxiliary scanning direction of two of the linear image sensors with respect to the remaining one of the linear image sensor used as a reference, and converting a luminance-level image signal produced by the linear image sensors into a density-level image signal with a luminance-to-density conversion table; and correcting aberrations and magnifications in the main scanning direction by reading a reference chart having marks spaced at equal intervals in the main scanning direction with the linear image sensors and thereafter calculating electric magnification correction coefficients with respect to the respective pixels such that reproduced images of the marks based on an image signal representative of the read marks will be spaced at equal intervals.

8. A method according to claim 1, further comprising the step of:

immediately after correcting the sensitivity variations, correcting a defective pixel by reading pixel signal levels relative to quantities of light near highlight and shadow areas of the subject with photoelectric transducer pixels of the linear image sensors, obtaining a linear function interconnecting the reading pixel signal levels, then reading a pixel signal level relative to a quantity of light smaller than the quantity of light near the shadow area, determining a pixel which produces the pixel signal level as a defective pixel if the pixel signal level deviates from a value estimated from said linear function by at least a predetermined range, storing the pixel number of the defective pixel, and, when a pixel signal produced by the defective pixel is actually read, outputting a signal having a level equal to an average of the levels of pixel signals preceding and following the pixel signal produced by the defective pixel, instead of the pixel signal produced by the defective pixel.

9. A method according to claim 2, further comprising the step of:

immediately after correcting the sensitivity variations, correcting a defective pixel by reading pixel signal levels relative to quantities of light near highlight and shadow areas of the subject with photoelectric transducer pixels of the linear image sensors, obtaining a linear function interconnecting the reading pixel signal levels, then reading a pixel signal level relative to a quantity of light smaller than the quantity of light near the shadow area, determining a pixel which produces the pixel signal level as a defective pixel if the pixel signal level deviates from a value estimated from said linear function by at least a predetermined range, storing the pixel number of the defective pixel, and, when a pixel signal produced by the defective pixel is actually read, outputting a signal having a level equal to an average of the levels of pixel signals preceding and following the pixel signal produced by the defective pixel, instead of the pixel signal produced by the defective pixel.

10. A method according to claim 3, further comprising the step of:

immediately after correcting the sensitivity variations, correcting a defective pixel by reading pixel signal levels relative to quantities of light near highlight and shadow areas of the subject with photoelectric transducer pixels of the linear image sensors, obtaining a linear function interconnecting the reading pixel signal levels, then reading a pixel signal level relative to a quantity of light smaller than the quantity of light near the shadow area, determining a pixel which produces the pixel signal level as a defective pixel if the pixel signal level deviates from a value estimated from said linear function by at least a predetermined range, storing the pixel number of the defective pixel, and, when a pixel signal produced by the defective pixel is actually read, outputting a signal having a level equal to an average of the levels of pixel signals preceding and following the pixel signal produced by the defective pixel, instead of the pixel signal produced by the defective pixel.

11. A method according to claim 4, further comprising the step of:

immediately after correcting the sensitivity variations, correcting a defective pixel by reading pixel signal levels relative to quantities of light near highlight and shadow areas of the subject with photoelectric transducer pixels of the linear image sensors, obtaining a linear function interconnecting the reading pixel signal levels, then reading a pixel signal level relative to a quantity of light smaller than the quantity of light near the shadow area, determining a pixel which produces the pixel signal level as a defective pixel if the pixel signal level deviates from a value estimated from said linear function by at least a predetermined range, storing the pixel number of the defective pixel, and, when a pixel signal produced by the defective pixel is actually read, outputting a signal having a level equal to an average of the levels of pixel signals preceding and following the pixel signal produced by the defective pixel, instead of the pixel signal produced by the defective pixel.

12. A method according to claim 5, further comprising the step of:

immediately after correcting the sensitivity variations, correcting a defective pixel by reading pixel signal levels relative to quantities of light near highlight and shadow areas of the subject with photoelectric transducer pixels of the linear image sensors, obtaining a linear function interconnecting the reading pixel signal levels, then reading a pixel signal level relative to a quantity of light smaller than the quantity of light near the shadow area, determining a pixel which produces the pixel signal level as a defective pixel if the pixel signal level deviates from a value estimated from said linear function by at least a predetermined range, storing the pixel number of the defective pixel, and, when a pixel signal produced by the defective pixel is actually read, outputting a signal having a level equal to an average of the levels of pixel signals preceding and following the pixel signal produced by the defective pixel, instead of the pixel signal produced by the defective pixel.

13. A method according to claim 6, further comprising the step of:

immediately after correcting the sensitivity variations, correcting a defective pixel by reading pixel signal levels relative to quantities of light near highlight and shadow areas of the subject with photoelectric transducer pixels of the linear image sensors, obtaining a linear function interconnecting the reading pixel signal levels, then reading a pixel signal level relative to a quantity of light smaller than the quantity of light near the shadow area, determining a pixel which produces the pixel signal level as a defective pixel if the pixel signal level deviates from a value estimated from said linear function by at least a predetermined range, storing the pixel number of the defective pixel, and, when a pixel signal produced by the defective pixel is actually read, outputting a signal having a level equal to an average of the levels of pixel signals preceding and following the pixel signal produced by the defective pixel, instead of the pixel signal produced by the defective pixel.

14. A method according to claim 7, further comprising the step of:

immediately after correcting the sensitivity variations, correcting a defective pixel by reading pixel signal levels relative to quantities of light near highlight and shadow areas of the subject with photoelectric transducer pixels of the linear image sensors, obtaining a linear function interconnecting the reading pixel signal levels, then reading a pixel signal level relative to a quantity of light smaller than the quantity of light near the shadow area, determining a pixel which produces the pixel signal level as a defective pixel if the pixel signal level deviates from a value estimated from said linear function by at least a predetermined range, storing the pixel number of the defective pixel, and, when a pixel signal produced by the defective pixel is actually read, outputting a signal having a level equal to an average of the levels of pixel signals preceding and following the pixel signal produced by the defective pixel, instead of the pixel signal produced by the defective pixel.

* * * * *